(12) United States Patent
Bakir

(10) Patent No.: US 8,799,215 B2
(45) Date of Patent: Aug. 5, 2014

(54) DATA PROCESSING METHOD, SYSTEM, AND COMPUTER PROGRAM PRODUCT

(75) Inventor: Huzefa Yusuf Bakir, Mumbai (IN)

(73) Assignee: Accenture Global Services Limited, Dublin (IE)

( * ) Notice: Subject to any disclaimer, the term of this patent is extended or adjusted under 35 U.S.C. 154(b) by 201 days.

(21) Appl. No.: 12/838,714

(22) Filed: Jul. 19, 2010

(65) Prior Publication Data

US 2011/0016086 A1 Jan. 20, 2011

(30) Foreign Application Priority Data

Jul. 17, 2009 (EP) .................................... 09009346

(51) Int. Cl.
*G06F 7/00* (2006.01)
*G06F 17/00* (2006.01)

(52) U.S. Cl.
USPC .......................................................... 707/610

(58) Field of Classification Search
USPC .......................................................... 707/610
See application file for complete search history.

(56) References Cited

U.S. PATENT DOCUMENTS

| | | | | |
|---|---|---|---|---|
| 6,757,698 | B2 * | 6/2004 | McBride et al. ...................... 1/1 |
| 7,496,645 | B2 * | 2/2009 | Yeung et al. .................. 709/223 |
| 7,499,951 | B2 * | 3/2009 | Mueller et al. ................ 715/762 |
| 7,917,607 | B2 * | 3/2011 | Becker et al. ................. 709/222 |
| RE42,465 | E * | 6/2011 | McCaw et al. ................ 707/610 |
| 2001/0011308 | A1 * | 8/2001 | Clark et al. ..................... 710/20 |
| 2002/0049778 | A1 * | 4/2002 | Bell et al. ....................... 707/200 |
| 2004/0267557 | A1 * | 12/2004 | Liu et al. ........................... 705/1 |
| 2008/0046676 | A1 * | 2/2008 | Peters ............................ 711/200 |
| 2008/0162587 | A1 * | 7/2008 | Auer et al. ..................... 707/201 |
| 2009/0254556 | A1 * | 10/2009 | Guo et al. .......................... 707/8 |
| 2009/0287746 | A1 * | 11/2009 | Brown .......................... 707/203 |

FOREIGN PATENT DOCUMENTS

| | | |
|---|---|---|
| CN | 1291310 A | 4/2001 |
| CN | 1722720 A | 1/2006 |
| TW | 200500899 | 1/2005 |

OTHER PUBLICATIONS

European Search Report for EP 09 00 9346, Oct. 29, 2009.
Yang Li et al., "Object-Oriented Data Synchronization for Mobile Database over Mobile Ad-hoc Networks", 2008 International Symposium on Information Science and Engineering, IEEE, Dec. 12, 2008.
Marek Ciglan et al., "Content Synchronization in Replicated Grid Database Resources", Third International IEEE Conference on Signal-Image Technologies and Internet-Based System, IEEE, Dec. 16, 2007.

* cited by examiner

*Primary Examiner* — Mariela Reyes
*Assistant Examiner* — Michael Pham
(74) *Attorney, Agent, or Firm* — Mannava & Kang P.C.

(57) ABSTRACT

The present description refers in particular to a data processing method, a computer program product, and a data processing system for obtaining and storing data in an outsourcing environment, the method including providing a user interface on a user computer; determining an indicator which indicates whether there is synchronization data in a user database, wherein the synchronization data is for synchronization with a remote database which is located on a remote computer; obtaining user data with the user interface; and storing the user data in the user database if the indicator indicates that there is synchronization data in the user database.

12 Claims, 28 Drawing Sheets

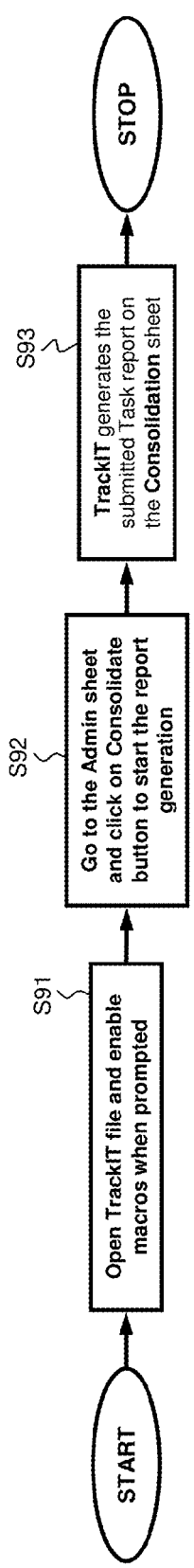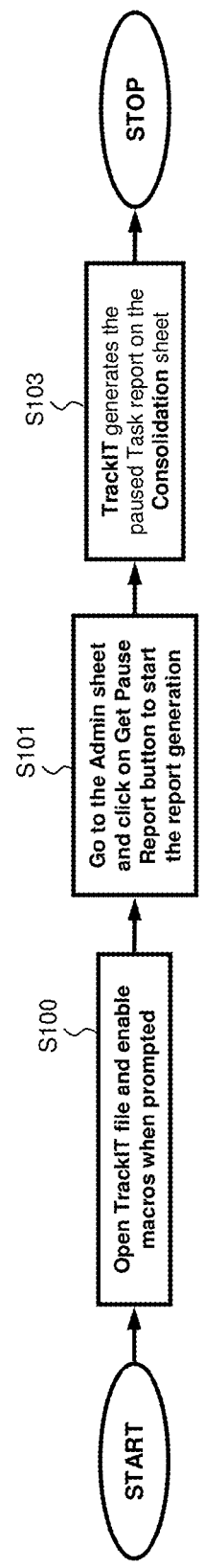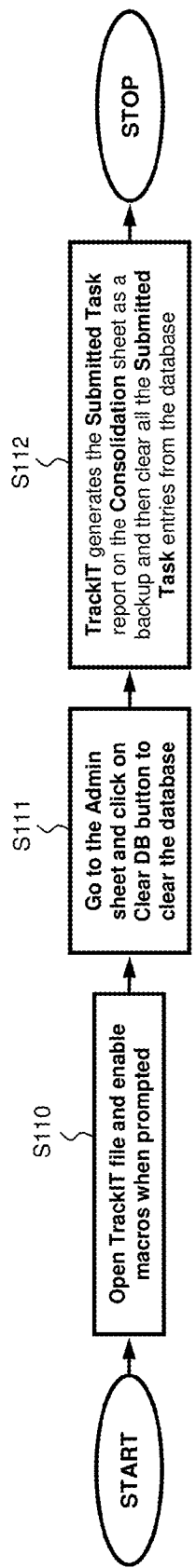

FIG. 21

| SI.NO. | PARAMETER NAME | PARAMETER TYPE | MANDATORY? | DATA TYPE | KEY? | LAST COL. | OPTIONS FOR DROPDOWN | | | |
|---|---|---|---|---|---|---|---|---|---|---|
| 1 | CALL DATE (MM/DD/YYYY) | FREE TEXT | YES | DATE | | | | | | |
| 2 | CALL QUEUE | DROP DOWN | NO | PLAIN TEXT | | V | MOTOR SALES | MOTOR SERVICE | FCR QUEUE | |
| 3 | POLICY # | FREE TEXT | NO | PLAIN TEXT | YES | | | | | |
| 4 | REASON FOR CURRENT CALL | DROP DOWN | NO | PLAIN TEXT | | AX | MR1 CHANGES -V.- SUB | MR1 CHANGES - OVERNIGHT LOCATION | MR1 CHANGES - DRIVER- ADD/REMOVE/CHANGE | |
| 5 | DATA OF PREVIOUS CALL (MM/DD/YYYY) | FREE TEXT | NO | DATE | | | | | | |
| 6 | RACF ID OF PREVIOUS CALL | FREE TEXT | NO | PLAIN TEXT | | | | | | |
| 7 | REASON FOR PREVIOUS CALL | DROP DOWN | NO | PLAIN TEXT | | AX | MR1 CHANGES -V.- SUB | MR1 CHANGES - OVERNIGHT LOCATION | MR1 CHANGES - DRIVER- ADD/REMOVE/CHANGE | |
| 8 | CALL BACK REQD? | DROP DOWN | NO | PLAIN TEXT | | I | YES | NO | | |
| 9 | REASON FOR CALL BACK | DROP DOWN | NO | PLAIN TEXT | | S | SYSTEM OUTAGE | SUPERVISOR UNAVAILABLE | POLICY ERROR | |
| 10 | CALL BACK | DROP DOWN | NO | PLAIN TEXT | | I | YES | NO | | |
| 11 | COMMENT | FREE TEXT | NO | PLAIN TEXT | | | | | | |

FIG. 22

| | A | B | C |
|---|---|---|---|
| 1 | KEY | VALUE | |
| 2 | DB PATH | \\10.190.110.148\SHARED$\TRACKITDB | |
| 3 | CREATE DB | CREATE DB | |
| 4 | DB BACKUP PATH | %USERPROFILE%\MY DOCUEMENTS | |
| 5 | TRACKER NAME | FCR TRACKER v1.0 | |
| 6 | TRACKER ADMINISTRATOR | HUZEFA BAKIR | |
| 7 | DISPLAY TIMER? | YES | |
| 8 | SYNCHRONIZE AUTOMATICALLY? | YES | |
| 9 | TRACKIT PATH | \\10.190.110.148\SHARED$\TR\TRACKIT | |
| 10 | | | |
| 11 | | | |
| 12 | | | |
| 13 | | | |
| 14 | | | |
| 15 | | | |
| 16 | | | |

401 — row 2
402 — row 3
403 — row 4
404 — row 5
405 — row 6
406 — row 7
407 — row 8
408 — row 9

| | A | B | C | D | E | F | G | H | J |
|---|---|---|---|---|---|---|---|---|---|
| 1 | KEY | NT ID | ENTRY DATE | ENTRY TIME | TRACKER ADMIN | TRACKER NAME | AMT | ENTRY TYPE | CALL DATE (MM/DD/YYYY) CALL QUEUE |
| 2 | | HUZEFA. BAKR | 28-MAR-09 | 17:48.00 | HUZEFA BAKIR | FCR TRACKER v1.0 | 0:03.19 | TASK DONE | 3-FEB-09 FCR QUEUE |
| 3 | | HUZEFA. BAKR | 28-MAR-09 | 17:56.05 | HUZEFA BAKIR | FCR TRACKER v1.0 | 0:01.10 | TASK PAUSE | 5-APR-09 HOME SALES |
| 4 | | HUZEFA. BAKR | 28-MAR-09 | 17:57.19 | HUZEFA BAKIR | FCR TRACKER v1.0 | 0:02.42 | TASK BREAK | |
| 5 | | HUZEFA. BAKR | 28-MAR-09 | 18:00.22 | HUZEFA BAKIR | FCR TRACKER v1.0 | 0:00.26 | TASK BREAK | |

FIG. 26

| | A | B | C | D | E | F | G | H | J | |
|---|---|---|---|---|---|---|---|---|---|---|
| 1 | NT ID | ENTRY DATE | ENTRY TIME | TRACKER ADMIN | TRACKER NAME | AMT | ENTRY TYPE | CALL DATE (MM/DD/YYYY) | CALL QUEUE | POLICY # |
| 2 | HUZEFA.B AKR | 28-MAR-09 | 17:48.00 | HUZEFA BAKIR | FCR TRACKER v1.0 | 0:03.19 | TASK DONE | 3-FEB-09 | FCR QUEUE | 456122423 |
| 3 | HUZEFA.B AKR | 28-MAR-09 | 17:56.05 | HUZEFA BAKIR | FCR TRACKER v1.0 | 0:01.10 | TASK PAUSE | 5-APR-09 | HOME SALES | 9842726467 |
| 4 | HUZEFA.B AKR | 28-MAR-09 | 17:57.19 | HUZEFA BAKIR | FCR TRACKER v1.0 | 0:02.42 | TASK BREAK | | | |
| 5 | HUZEFA.B AKR | 28-MAR-09 | 18:00.22 | HUZEFA BAKIR | FCR TRACKER v1.0 | 0:00.26 | TASK BREAK | | | |

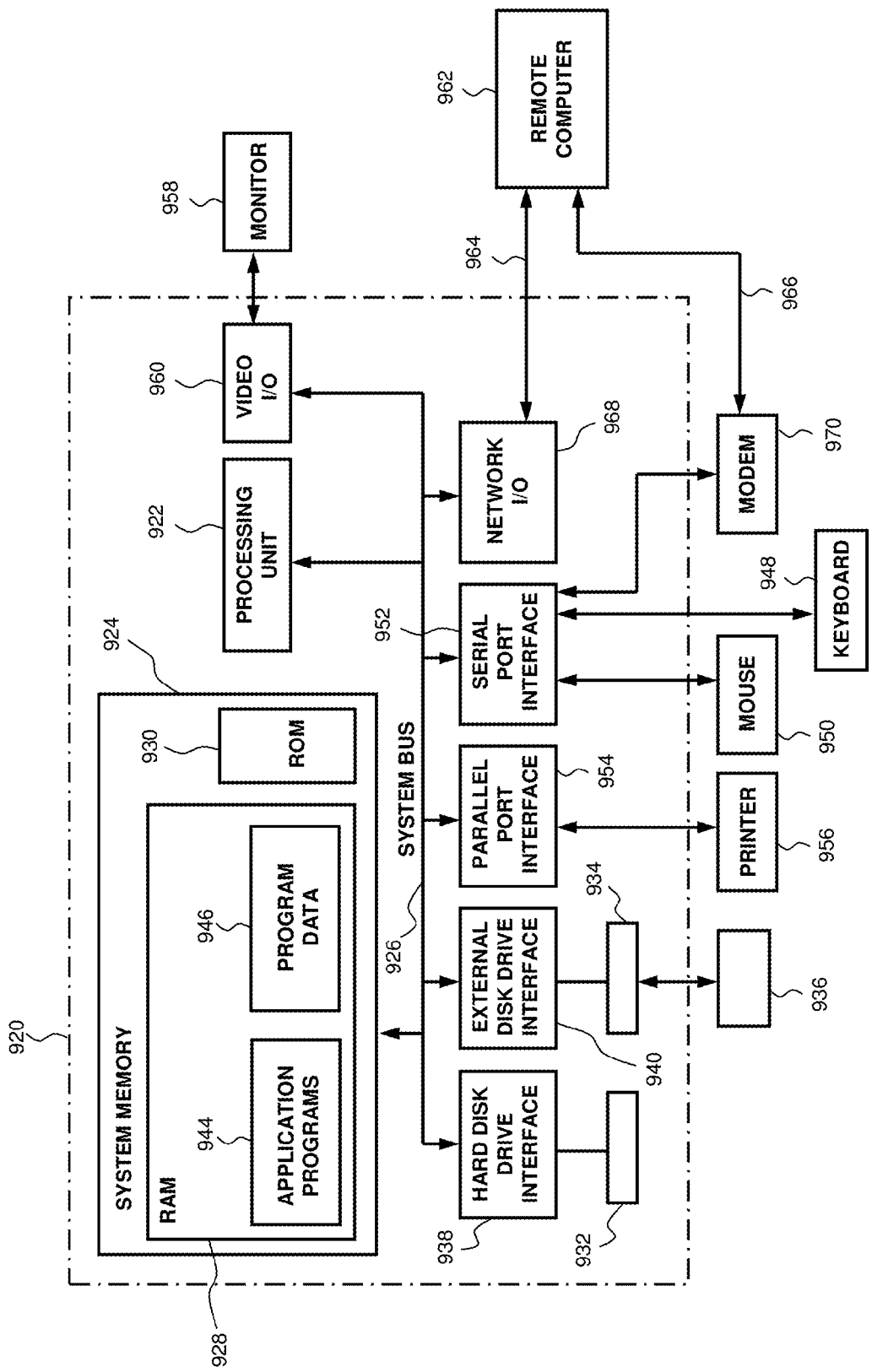

DATA PROCESSING METHOD, SYSTEM, AND COMPUTER PROGRAM PRODUCT

PRIORITY

This application claims priority to European patent application serial number 09 009 346.9-1527, filed on Jul. 17, 2009, and entitled "A data processing method, system, and computer program product", which is incorporated by reference in its entirety.

TECHNICAL FIELD

The following description relates to data processing in an outsourcing environment.

BACKGROUND

Outsourcing may be understood to describe a situation where a client organization imposes a specific set of tasks upon a third party. The third party may be a separate or an auxiliary organization. The third party may be located in an another country or a location near the client organization. One example of outsourcing is a third party providing information technology services for an automobile and/or a machine tools manufacturer. These information technology services might range from supply chain management to the control of manufacturing processes. Some of these information technology services might be performed in one country whereas other information technology services may be performed in a different country.

An outsourcing environment may be understood to include objects, processes, and circumstances defining how the third party performs tasks for the client organization. The elaboration of the outsourcing environment may include information system configuration requirements, access control requirements or restriction enclosed for the sake of security. The objects in the outsourcing environment may include equipment, such as computers configured according to the configuration requirements. It may be desirable for the client organization to define a part of an outsourcing environment for the third party in order to mitigate risk and maintain accountability within the client organization. Thus, the third party may be required to operate under restrictions outside its control.

One or more technical restrictions may be imposed on the users, user computers, and/or server computers in an outsourcing environment. It may be desirable to constrain the communication of computers in an outsourcing environment to one local area network LAN, or to limit the communications of computers in an outsourcing environment to an explicitly defined set of computers. Network connectivity in an outsourcing environment may be limited to users and computers directed to perform specific tasks. It may also be desirable to restrict user access to computers and/or to restrict the interactions between computers.

The outsourcing environment may limit communications and/or the exchange of data between computers. In particular, the outsourcing environment may limit the open TCP/IP ports and/or the services which may be enabled or run on user computers. In addition, it may not be possible to operate a web server or configure a computer system to accept connections conforming to the Hypertext Transfer Protocol (HTTP or HTTPS), in the outsourcing environment. Also, it may not be possible to operate a database server in the outsourcing environment; in particular, it may not be possible to configure a computer to accept connections conforming to database protocols such as Transparent Network Substrate (Oracle), SQL*Net (Oracle), Tabular Data Stream (Microsoft), or similar protocols (Microsoft is a trademark of Microsoft Corporation; Oracle is a trademark of Oracle Corporation). Furthermore, it may not be possible to make changes to the system registry on a user computer in the outsourcing environment. Moreover, direct access to the Internet may not be allowed in the outsourcing environment.

One or more of the terms in this application may be a trademark of a corresponding owner.

SUMMARY

Thus, it is a problem to obtain and store user data in an outsourcing environment. This problem is solved according to the independent claims. Preferred embodiments are defined in the dependent claims.

According to an aspect of this application, a data processing method for obtaining and storing user data in an outsourcing environment is provided. The method includes providing a user interface on a user computer. The method further includes determining an indicator which indicates whether there is synchronization data in the user database, wherein the synchronization data is for synchronization with a remote database which is located on a remote computer. The method also includes obtaining user data with the user interface. In addition, the method includes storing the user data in the user database if the indicator indicates that there is synchronization data in the user database.

Thus, the method may decrease the mental and physical effort required from a user in order to perform a task (e.g. storing data), since the user does not need to worry about where data is stored. In addition, the indicator may enable an improved, continued man-machine interaction, by facilitating the storage and synchronization of data.

It may be that, if the indicator indicates that there is no synchronization data in the user database, the method further includes verifying whether the remote database is available. In the negative, the method may further include storing the user data in the user database attempting to synchronize the user database with the remote database after storing the user data in the user database. Otherwise, in the affirmative, the method may include storing the user data in the remote database.

Furthermore, it may be that, if the indicator indicates that there is synchronization data in the user database, the method further includes verifying whether the remote database in available. In the affirmative, the method may also include synchronizing the user database with the remote database, and recording a timestamp of the user database.

Determining the indicator may comprise obtaining a current timestamp of the user database and comparing the current timestamp with the recorded timestamp. Alternatively, determining the indicator may comprise examining an indicator value. If the indicator value indicates that there is no synchronization data in the user database, the method may further comprise verifying whether the remote database is available. In the affirmative, the method may comprise copying the data in the user database to the remote database, and setting the stored value to indicate that there is no synchronization data in the user database.

The user computer and the remote computer may be connected by a network. In this case, the remote computer may be accessed by the user computer using a virtual private network (VPN), and/or a remote graphical user interface.

Providing the user interface on the user computer may comprise executing a computer program on the remote computer from the user computer. The computer program is preferably configured so that input of the user data is prohibited or blocked if the computer program is executed directly on the user computer. In other words, if the computer program is copied from the remote computer to the user computer, the computer program cannot be executed on the user computer.

It may be that the method further includes receiving user input selecting the user database as a default database. In this case, an attempt to synchronize the user database with the remote database is only made after receiving a signal to synchronize the user database with the remote database. The signal may comprise user input.

It may be that the indicator indicates that there is synchronization data in the user database. If the indicator so indicates, the method may further include verifying whether the remote database is available. In the affirmative, the method may include opening a connection from the user computer to the remote computer, and synchronizing the user database with the remote database. In addition, the method may include copying stored user data, including the synchronized data, from the remote database to the user computer before closing the connection to the remote database. Stored user data may be understood as user data obtained with the user interface, and stored in the remote database. In the negative, i.e. if the remote database is unavailable, the method may include storing user data in the user database, and attempting to synchronize the user database with the remote computer. Attempting to synchronize the user database with the remote computer may be understood as attempting to synchronize the user database with the remote database.

It may be that if user input to shut down the user interface is received, an attempt is made to synchronize the user database with the remote database if there is synchronization data in the user database. This may include providing a notification on the user interface if the attempt to synchronize was unsuccessful.

According to another aspect, a computer program product including computer readable instructions is provided. Computer readable instructions may be stored on a computer readable medium and/or provided as a data stream. The computer program product, when loaded and executed on a computer system, may cause the computer system to perform operations according to the method steps described above.

According to yet another aspect, a data processing system for obtaining and storing user data in an outsourcing environment is provided. The system includes a user computer, and the user computer includes a user database and a user interface, wherein the user interface is operable to obtain user data. Furthermore, the system includes an indicator which indicates whether there is synchronization data in the user database. Accordingly, the user computer is operable to determine the indicator. In addition, the synchronization data is for synchronization with a remote database which is located on a remote computer. Moreover, the user computer is operable to store the user data in the user database if the indicator indicates that there is synchronization data in the user database. In addition, the system is preferably operable to perform operations according to any of the method steps described above.

The subject matter described in the specification can be implemented as a method or as a system, possibly in the form of one or more computer program products. The subject matter described in the specification can be implemented in a data signal or on a machine readable medium, where the medium is embodied in one or more information carriers, such as a CD-ROM, a DVD-ROM, a semiconductor memory, or a hard disk. Such computer program products may cause a data processing apparatus to perform one or more operations described in the specification.

In addition, subject matter described in the specification can also be implemented as a system including a processor, and a memory coupled to the processor. The memory may encode one or more programs to cause the processor to perform one or more of the methods described in the specification. Further subject matter described in the specification can be implemented using various machines.

Details of one or more implementations are set forth in the accompanying exemplary drawings and description below. Other features will be apparent from the description, the drawings, and from the claims.

BRIEF DESCRIPTION OF THE DRAWINGS

FIG. 10a shows steps which may be carried out in order to generate a submitted task report.

FIG. 10b shows steps which may be carried out in order to generate a paused task report.

FIG. 10c shows exemplary steps performed in order to clear a database.

FIG. 21 shows an exemplary screen shot of a design sheet.

FIG. 22 shows an exemplary screen shot of a setup sheet.

FIG. 23 is an exemplary screen shot of a splash screen.

FIG. 24 is an exemplary screen shot of a data tracking or tracker sheet.

FIG. 25 is an exemplary screen shot of a report sheet.

FIG. 26 is an exemplary screen shot of a consolidation sheet.

FIG. 27 is a block diagram of a computer system.

TECHNICAL TERMS AND DEFINITIONS

Figure 1:
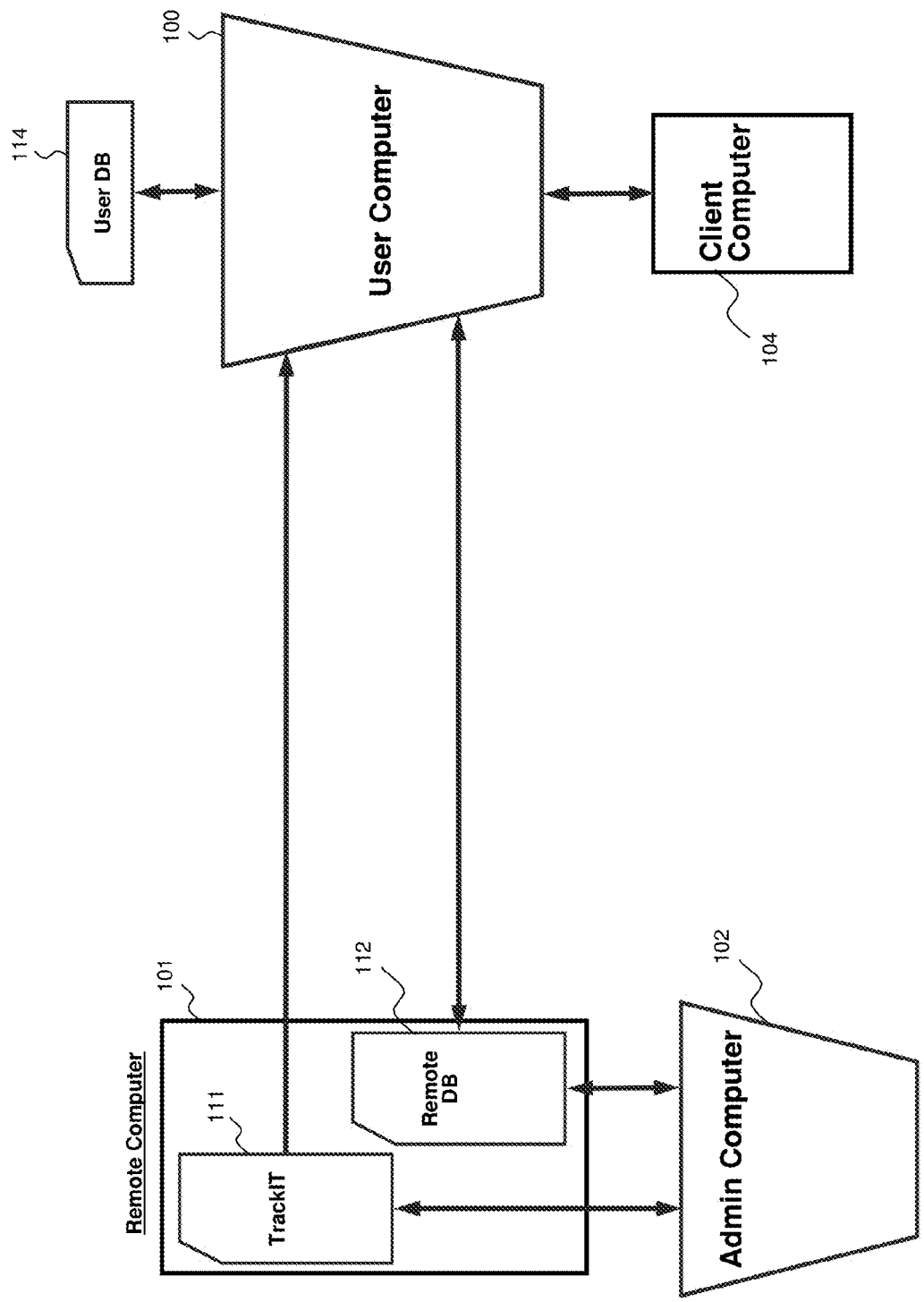
FIG. 1 is a block diagram of a user computer with a user database (DB), a remote computer with a remote database (DB), and an administrator (admin) computer.

The following technical terms are used throughout the description. The terms may refer, but are not limited to the following explanations.

The user data may be understood as data input by a user or data input by means of a batch process. When stored in a database, user data may be understood to form all or part of the contents of the database. User data may be distinguished from metadata, which describes the structure of, and constraints on the database. User data may also be distinguished from indexes, which may be understood as data structures that support efficient access to user data.

A user computer may be understood as any computer which is accessible by a user. The user computer may be a client, a server, a personal computer, a mainframe or a mobile computing device.

An admin computer may be understood as a computer from which administrative tasks can be performed. The admin computer may be the same as the user computer or the admin computer may be separate from the user computer. The admin computer may be a client, a server, a personal computer, a mainframe or a mobile computing device.

A remote computer may be understood as a computer which is separate from the user computer. The remote computer may be connected to the user computer via a network. The remote computer may be spatially distant from the user computer and/or the admin computer. The remote computer may be a client, a server, a personal computer, a mainframe or a mobile computing device.

A client computer may be understood as a computer which is separate from the user computer. The client computer may also be separate from the remote computer and the admin computer. The client computer may be administered by the client organization and may be spatially distant from the user computer and/or the admin computer. The client computer may be a client, a server, a personal computer, a mainframe or a mobile computing device.

A user interface may be understood to allow a user to interact with a computer. In other words, a user interface acts as a bridge between applications and users.

A Virtual Private Network (VPN) may be understood as a network where packets that are internal to a private network pass across a public network (e.g. the Internet), without this being apparent to hosts on the private network. A VPN may encrypt packets which pass across the public network. It may be a characteristic of a VPN that when a computer, such as the user computer, can only connect to one VPN at a time. In other words, given a first VPN and a second VPN, when the user computer connects to the second VPN, the user computer can no longer connect to the first VPN.

A remote graphical user interface or remote graphic interface may allow a user to use a remote system as if he were sitting directly in front of it. Examples of programs providing a remote graphical user interface include Microsoft Terminal Services, Microsoft Remote Desktop, and Citrix Independent Computer Architecture (ICA) (Citrix and ICA are trademarks of Citrix Systems Inc.).

A database may be understood as a managed collection of data. A database may be relational, object oriented, object relational, or the database may be structured according to another model.

A spreadsheet, worksheet or sheet may be understood as an electronic representation of multiple cells or fields that together make up a grid consisting of rows and columns. A spreadsheet may be displayed inside an application program, such as Microsoft Excel (Excel is a trademark of Microsoft Corporation).

Synchronization may involve copying data from one database to another. In particular, synchronization may involve copying data from a user database to a remote database when the data to be copied from the user database is not present on the remote database.

The availability of a computer or database may be understood to refer to the ability of a user to access the computer or the database respectively. Thus, if a user computer can access a database, the database is available; if a user computer cannot access the database, the database is unavailable.

Detailed Description

In the following text, a detailed description of examples will be given with reference to the drawings. It should be understood that various modifications to the examples may be made. In particular, elements of one example may be combined and used in other examples to form new examples.

FIG. 1 depicts a user computer 100, a remote computer 101, an admin computer 102, and a client computer 104. Even though the admin computer 102 is depicted separately from the user computer 100, it should be noted that tasks performed on a user computer 100 may also be performed on the admin computer 102, and that tasks performed on the admin computer 102 may also be performed on the user computer 100. The remote computer 101 may also be referred to as the server computer, server or remote server.

According to the specific example depicted in FIG. 1, the remote computer 101 contains a TrackIT folder 111 and a remote DB folder 112. A folder may be understood as synonymous with a directory, i.e. a means of grouping files. The folder TrackIT 111 may comprise a computer program which can be executed from the user computer in order to provide the user interface on the user computer.

The computer program in the TrackIT folder 111 may be referred to as TrackIT or TrackIT.xls. Accordingly, the computer program may be an Excel spreadsheet comprising macros. A macro may be understood to refer to a unit of code written using Microsoft's Visual Basic for Applications programming language (Visual Basic is a trademark of Microsoft Corporation). The remote DB folder 112 may include the remote database. TrackIT 111 and remote DB 112 may be folders accessible using Microsoft Windows file sharing protocols. The remote computer 101 may be accessible from the user computer 100 and/or the admin computer 102 using a virtual private network (VPN) and/or a remote graphical user interface. The client computer 104 may be accessible from the user computer 100 and/or the admin computer 102 using a virtual private network and/or a remote graphical user interface. The VPN used to access the remote computer 101 may be different from the VPN used to access the client computer 104.

It should be noted that while only one user computer 100, one remote computer 101, one admin computer 102, and one client computer 104 are depicted, multiple user computers, remote computers, admin computers and/or client computers are possible.

The remote computer 101 and the admin computer 102 may be understood to be part of a tracking computer network. When connected to the remote computer 101, the user computer 100 may also be understood to be part of the tracking computer network. Due constraints imposed by a specific environment, e.g. the outsourcing environment, when connected to the client computer 104, the user computer 100 may be understood to be outside the tracking computer network.

A user database 114 may also be referred to as user DB 114. The user database 114 may be located on or at the user computer 100. The user DB 114 may also be referred to as the backup database. The remote database may be located on the remote computer 101. The remote database may also be referred to as the server database.

Alternatively, the user DB 114 may be located on another computer connected to the user computer 100 via a network. In particular, the network connecting the user computer 100 to the one or more computers upon which the user DB 114 is stored may be faster and/or more reliable than a network connecting the user computer 100 to the remote computer 101.

According to one example, the TrackIT program may be executed in order to design fields/parameters and configure settings for the TrackIT program. In addition, a database may be created in the remote DB folder 112 and reports may be generated using the database. TrackIT may be run from the user computer 100, and the parameters for tracking may be loaded in the user computer 100 from the remote computer 101. In particular, the TrackIT program may be understood to provide instructions, i.e. source code in the form of macros, which define how an application, e.g. Microsoft Excel, is executed. Moreover, tasks may be stored in a database located in the remote DB folder 112 and task reports may be generated from the database. In some cases, the TrackIT program stores user data in the user database 114 when access to the remote database on the remote computer 101 is lost.

Figure 2:
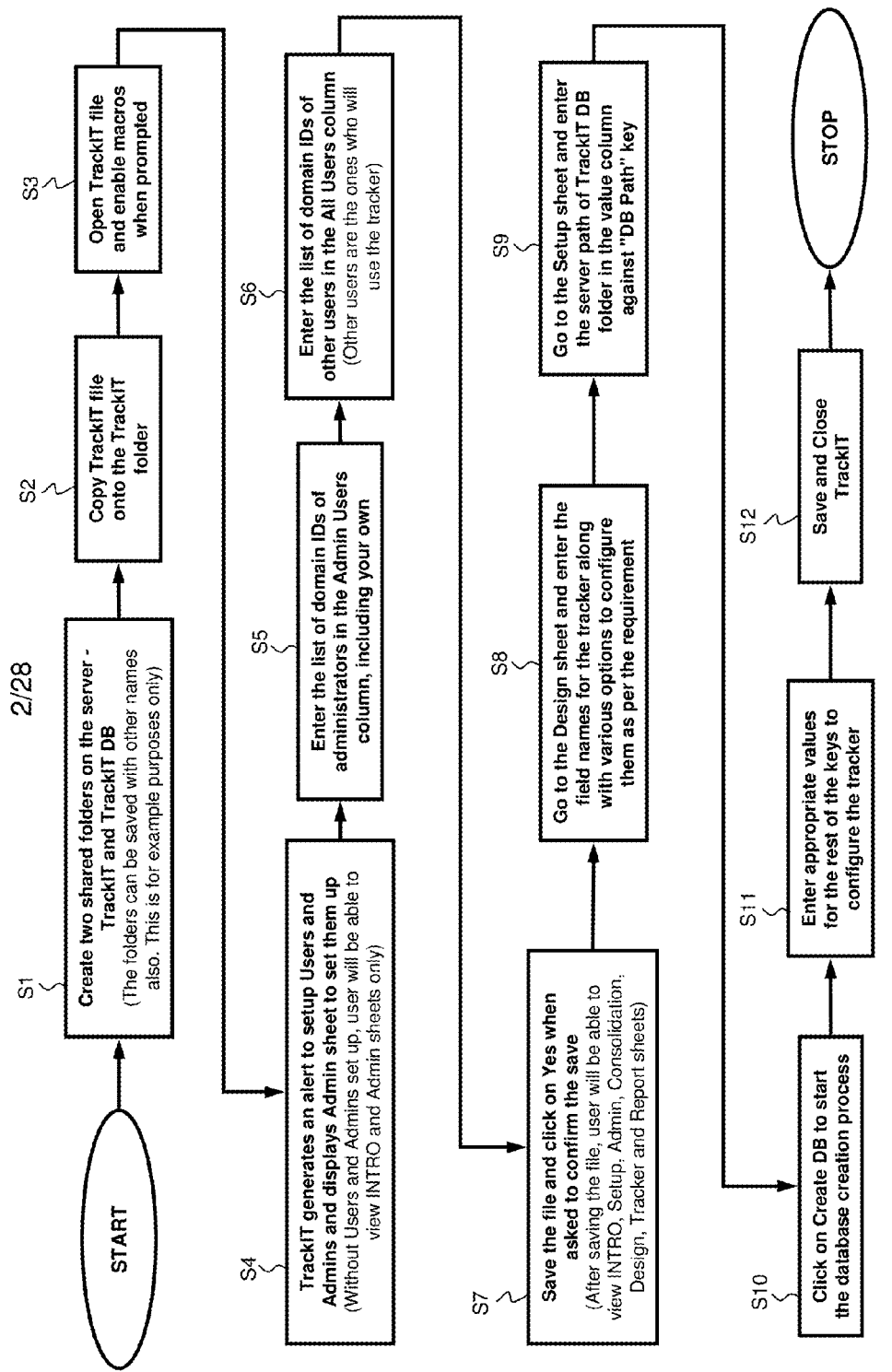
FIG. 2 shows steps which may be performed for initial setup.
Figure 20A:
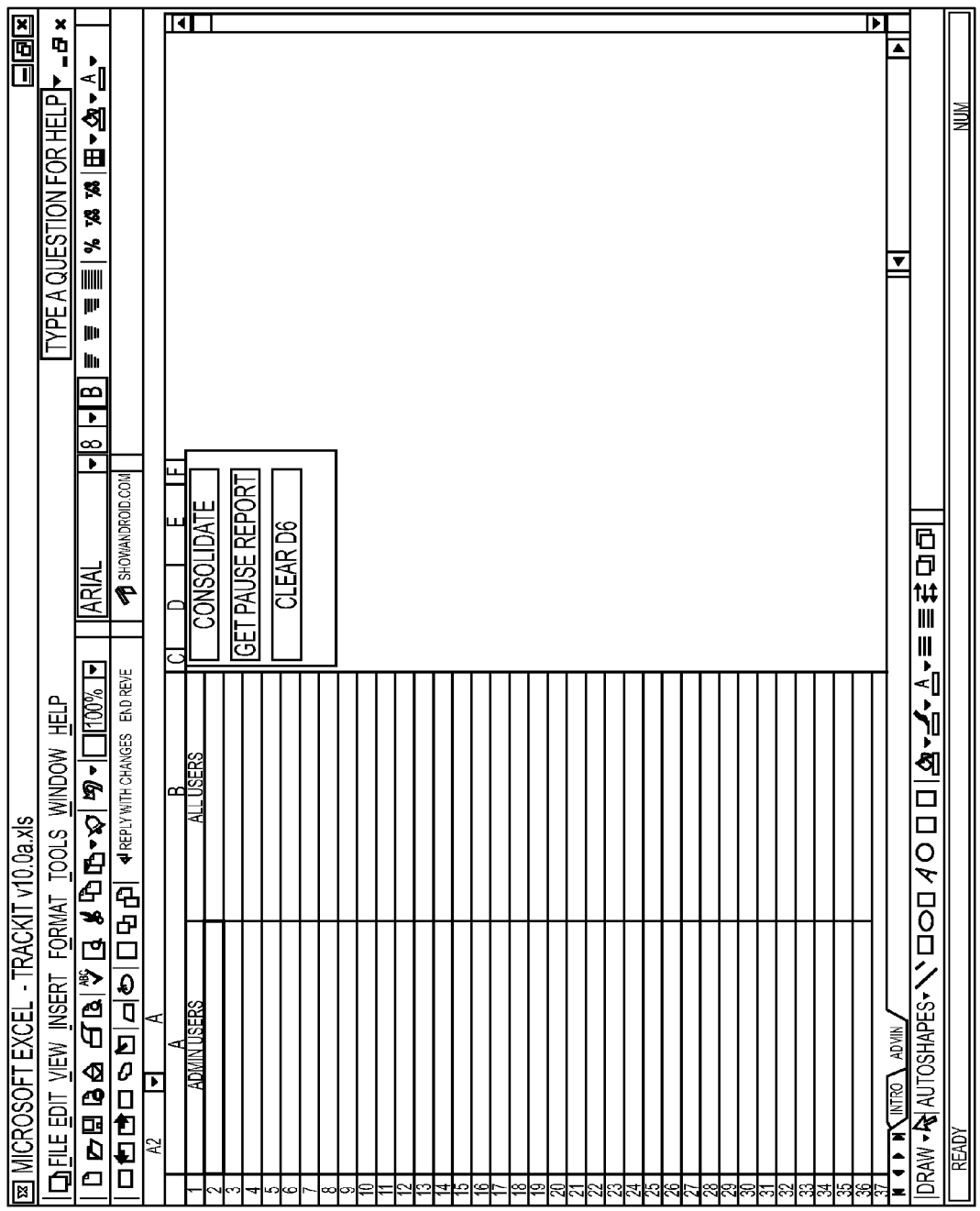
FIG. 20a shows an exemplary screen shot of an admin sheet.

FIG. 2 depicts steps which may be performed to set up and configure elements shown in FIG. 1. In step S1, the TrackIT folder 111 and the remote DB folder 112 may be created on the remote computer 101. A shared folder may be understood as a folder or directory which contains files that are shared using a file sharing protocol. Exemplary file sharing protocols are Microsoft's Common Internet File System (CIFS) for use on a Microsoft Windows platform and the Network File System (NFS) for use on a Unix platform. In step S2, the TrackIT program file is copied into the TrackIT folder 111 on the remote computer 101. According to one example, the TrackIT program file is a Microsoft Excel spreadsheet comprising macros. In step S3, the TrackIT program in the TrackIT folder 111 is executed from the user computer 100 and the user is prompted to enable macros. It may be the case that Microsoft Excel has already been executed before performing step S3. In step S4, a signal or alert is provided to indicate that users and administrators should be set up, and an admin sheet, for example, the admin sheet depicted in FIG. 20a, is displayed in order to add users and administrators. In step S5, a list of domain IDs for administrators is entered in the admin users column of the admin sheet. A domain ID may be understood as a login or user account identifier in a Microsoft Windows domain. In step S6, the user enters the list of domain IDs for non administrative users and the users column of the admin sheet. In step S7, the user saves the changes made to the admin sheet. Later, the user may perform steps S8 to S12 to finish the setup process.

FIGS. 3 to 9 depict steps which may be performed when tracking data using the TrackIT program.

Figure 3:
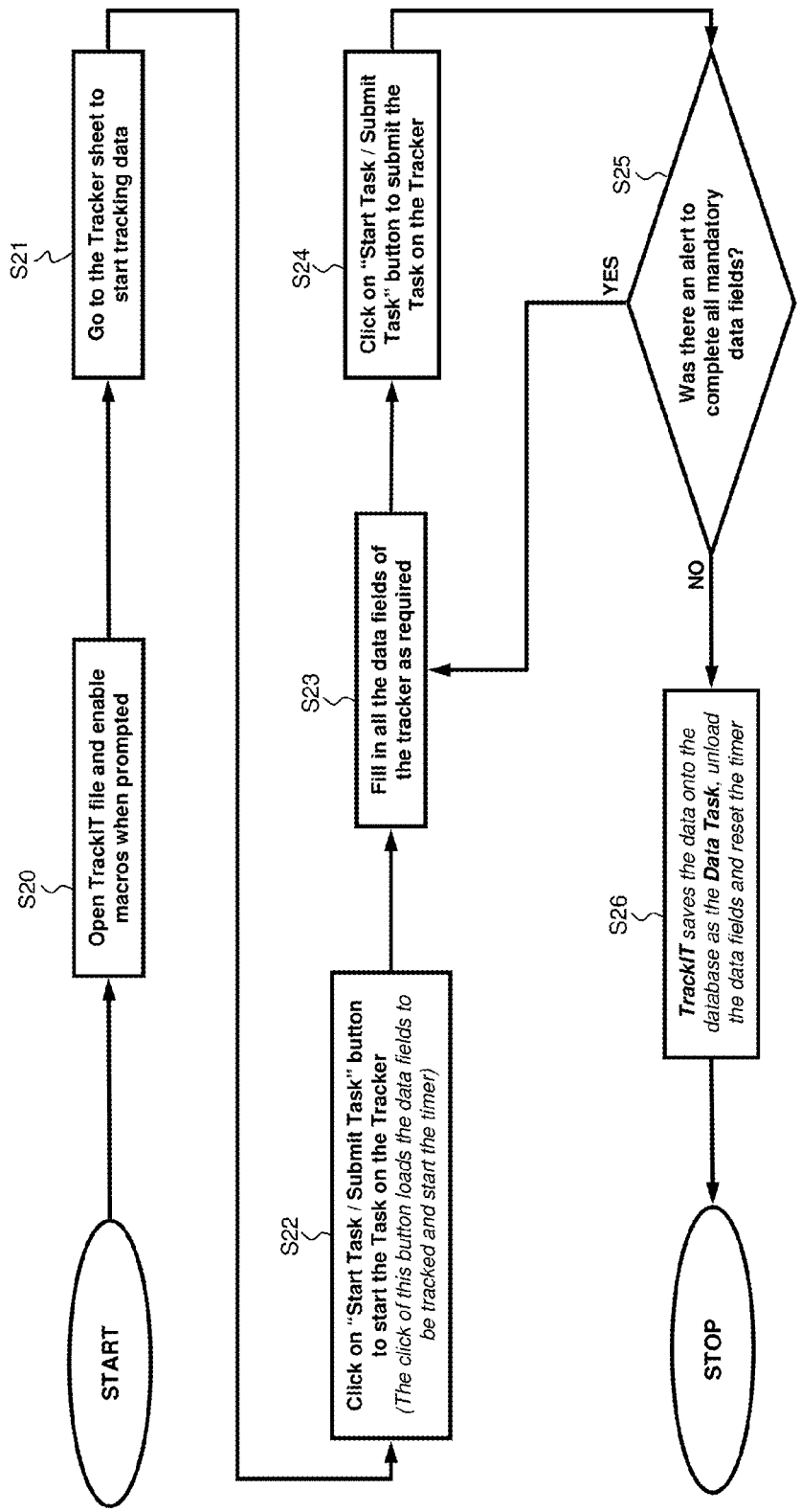
FIG. 3 shows steps which may be performed to start and submit the task.

FIG. 3 shows steps which may be performed in order to start a task and submit it. After step S20, step S21 may be performed in order to go to a tracker sheet, for example, the tracker sheet depicted in FIG. 24, so as to start tracking data. Steps S22 to S26 may also be performed in order to start a task, submit the task and store user data associated with the task.

Figure 4:
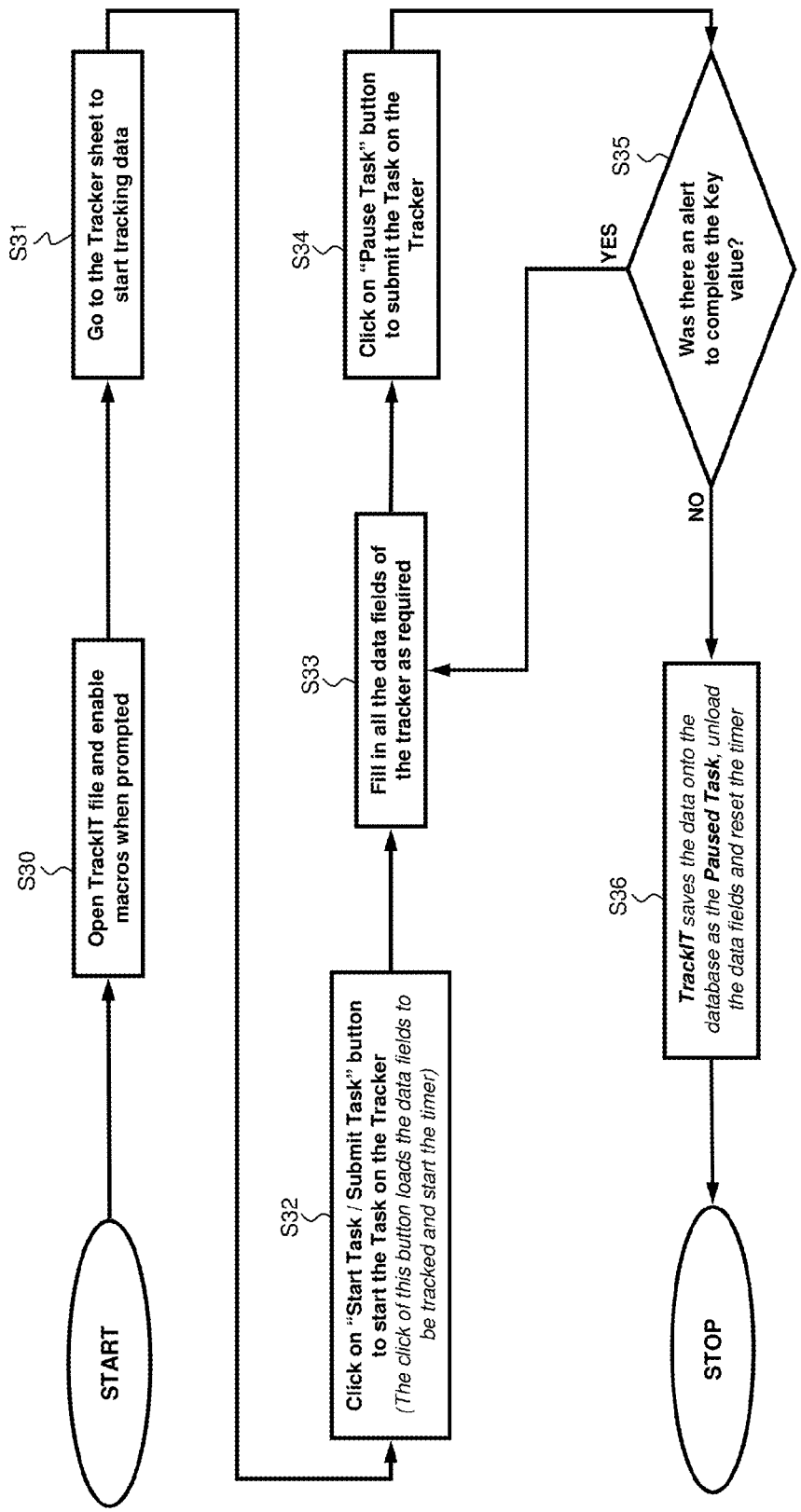
FIG. 4 shows steps which may be performed to start and pause a task.

FIG. 4 shows steps which may be performed in order to start a task and pause it. Pausing a task may be understood as stopping a task before it is completed.

Figure 5:
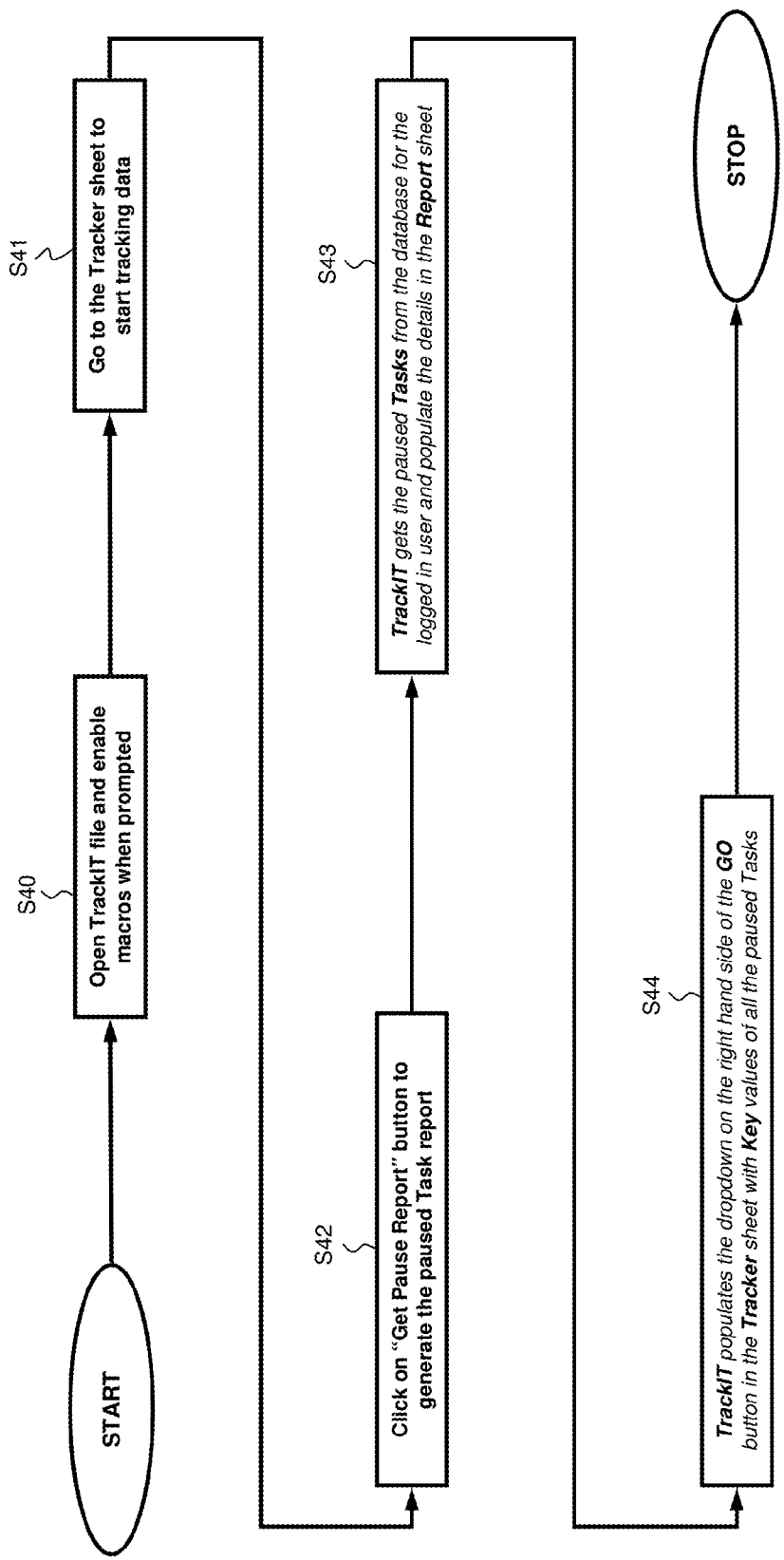
FIG. 5 shows steps which may be performed to generate a report regarding paused tasks.

FIG. 5 shows steps which may be performed in order to generate a report regarding paused tasks. The report may show user data stored by a single user. After receiving user input in step S42, the TrackIT program will populate a report sheet, for example, the report sheet depicted in FIG. 25. Subsequently, step S44 may be performed.

Figure 6:
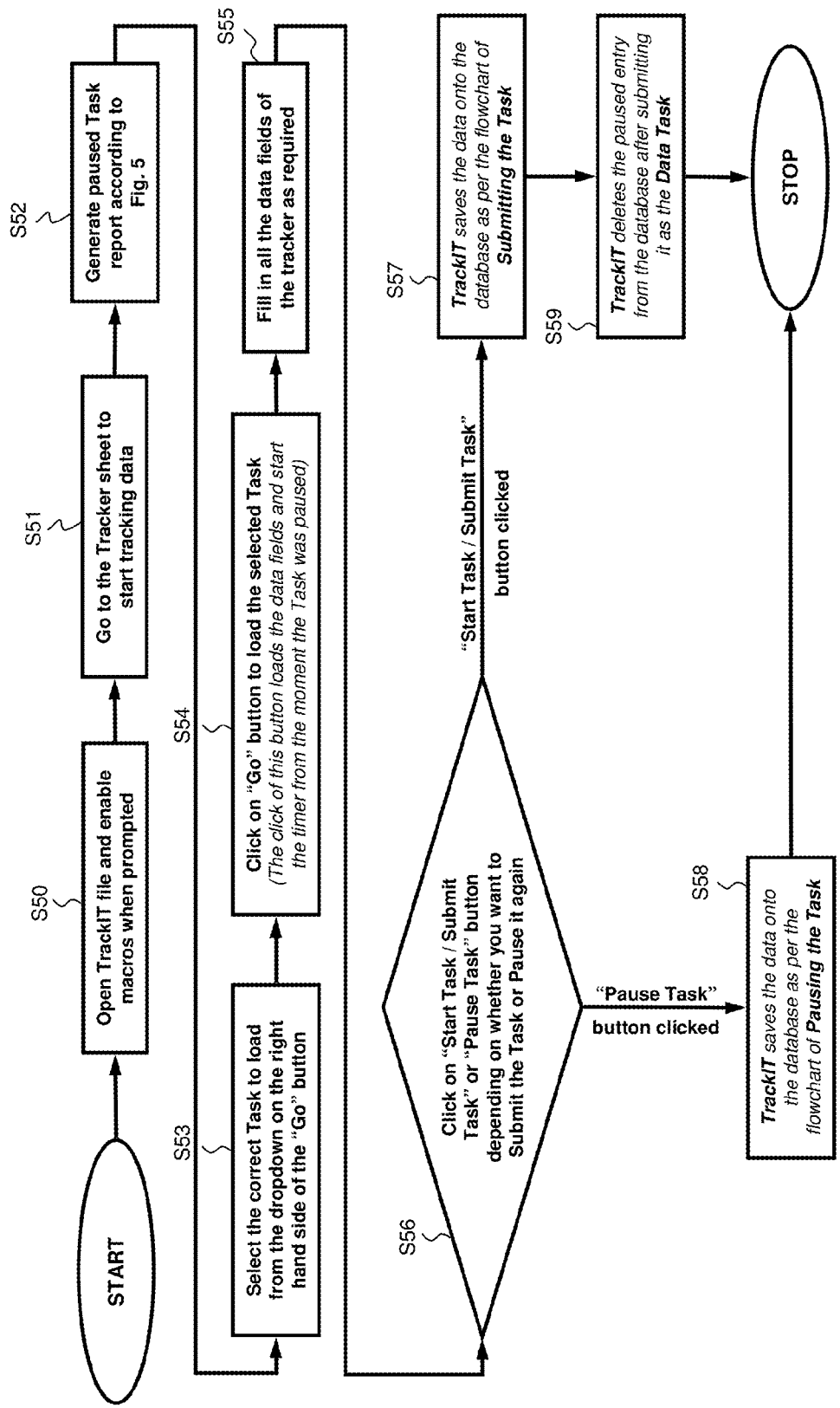
FIG. 6 shows steps which may be performed to load a paused task, and submit the task or pause it again.

FIG. 6 shows the steps which may be performed in order to load a paused task, and submit or pause it again. Steps S53 to S56 may involve user interaction with the tracker sheet.

Figure 7:
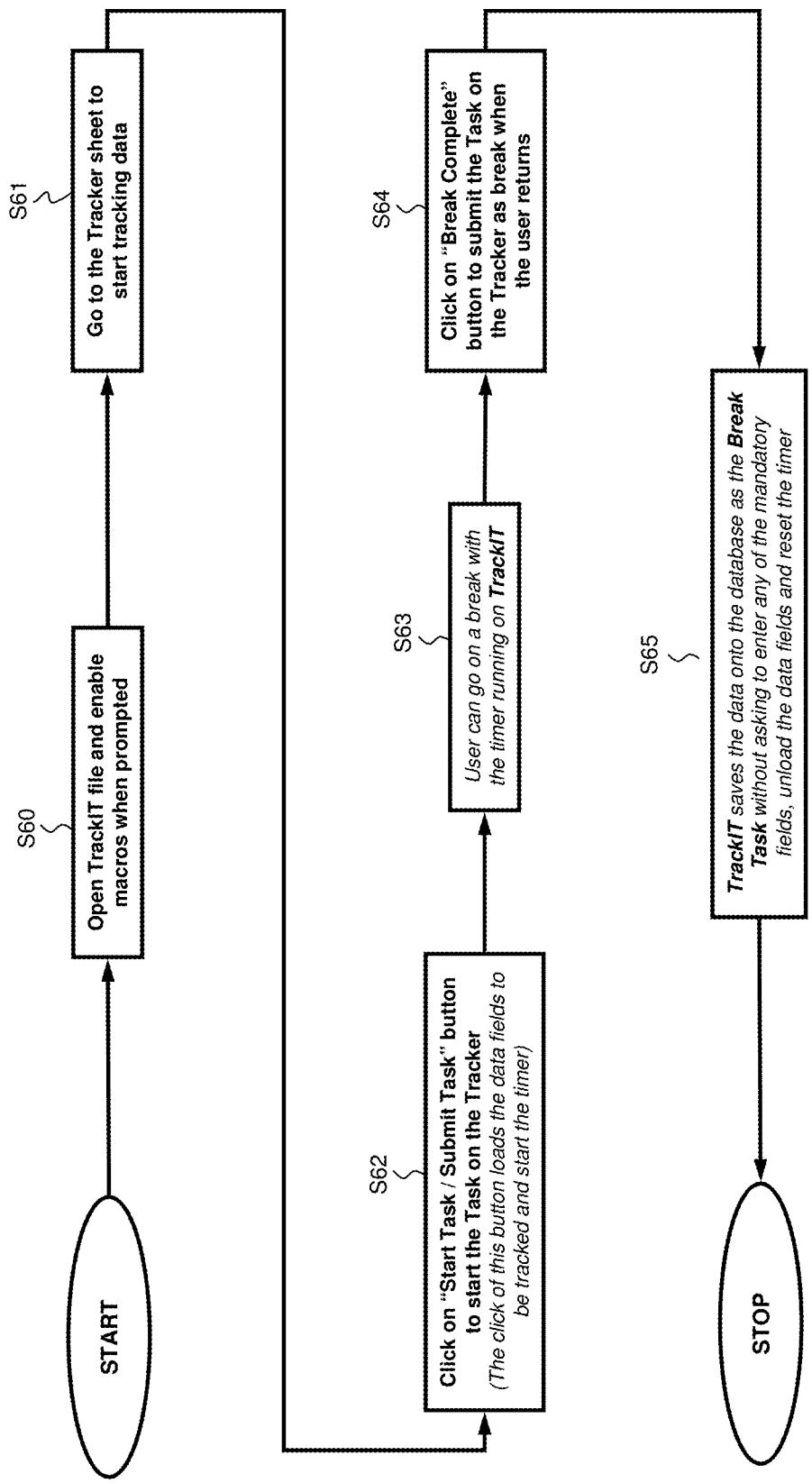
FIG. 7 shows steps which may be carried out in order to start a task and submit a break entry.

FIG. 7 depicts the steps which may be performed in order to record a break using the TrackIT program. A break may describe a period when a user stops working.

Figure 8:
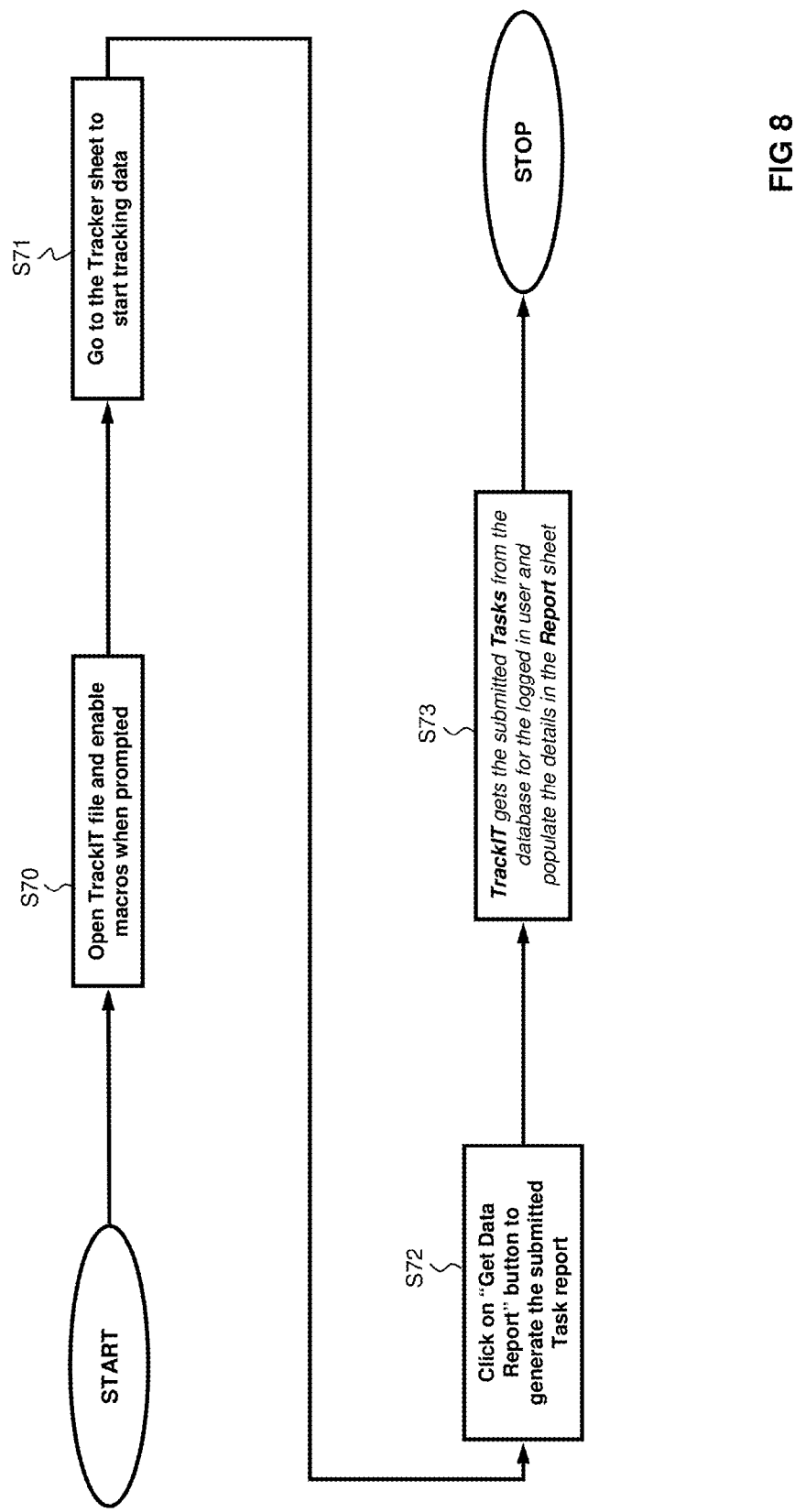
FIG. 8 shows steps which may be carried out in order to generate a report on submitted tasks.

FIG. 8 depicts steps which may be performed in order to generate a report regarding tasks submitted to the TrackIT program. The report may show user data corresponding to a single user computer 100 and/or a single user. The report sheet referred to in step S73 may be the report sheet depicted in FIG. 25.

Figure 9:
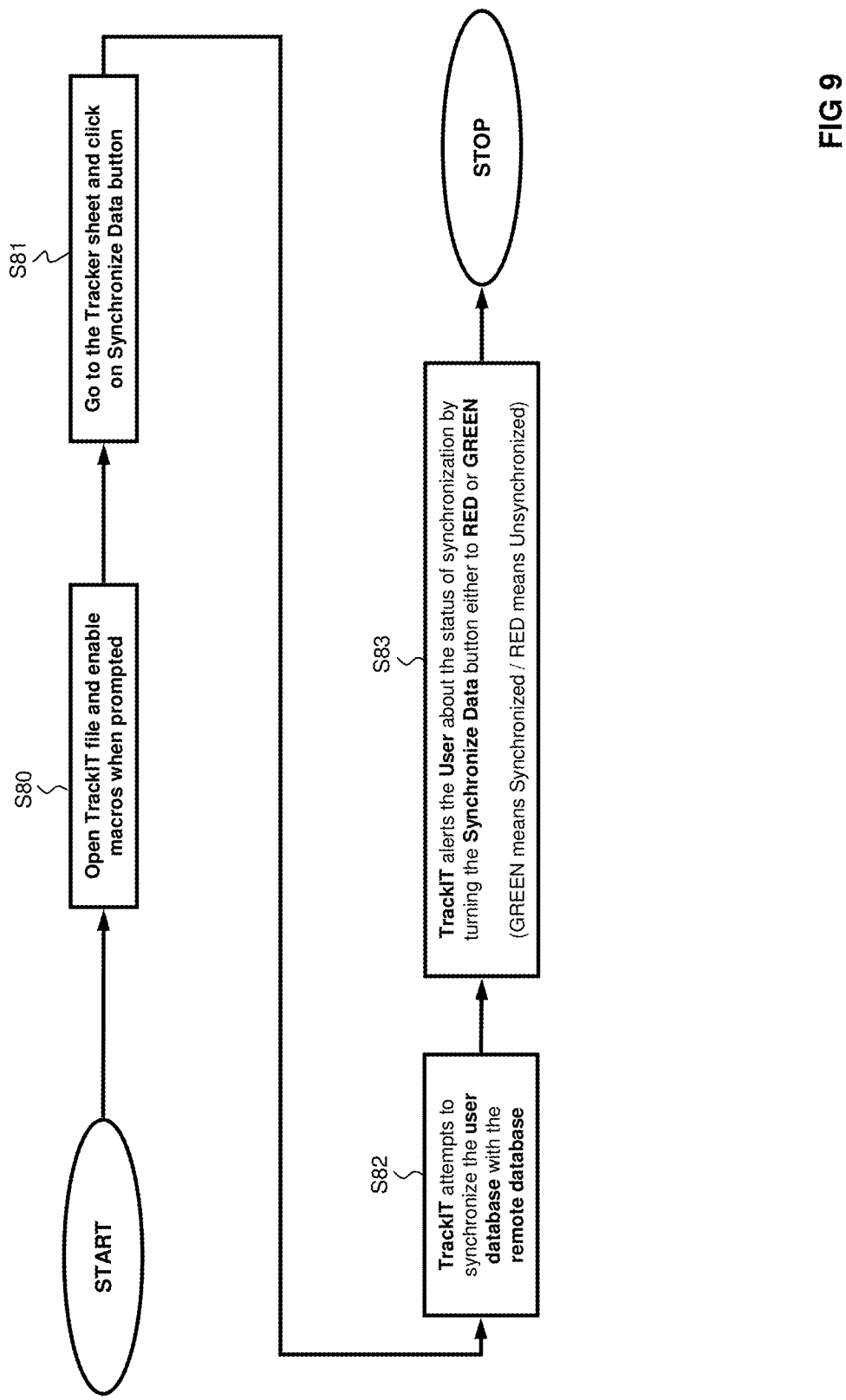
FIG. 9 shows an overview of steps which may be performed in order to manually synchronize data.

FIG. 9 depicts an overview of steps which may be performed in order to synchronize data.

The steps shown in FIGS. 10a to 10c may be used to display reports for user data stored by all users.

FIG. 10a depicts steps which may be performed to generate a report regarding tasks submitted using the TrackIT program. The Admin sheet referred to in step S92 may be the admin sheet depicted in FIGS. 20a and 20b. The consolidation sheet referred to in step S93 may be the consolidation sheet depicted in FIG. 26.

FIG. 10b depicts steps which may be performed to generate a report regarding tasks paused using the TrackIT program.

FIG. 10c depicts steps which may be performed in order to clear the remote database. It may be desirable to clear the remote database due to disk space constraints, and/or so that more tasks can be entered using the TrackIT program.

Figure 11A:
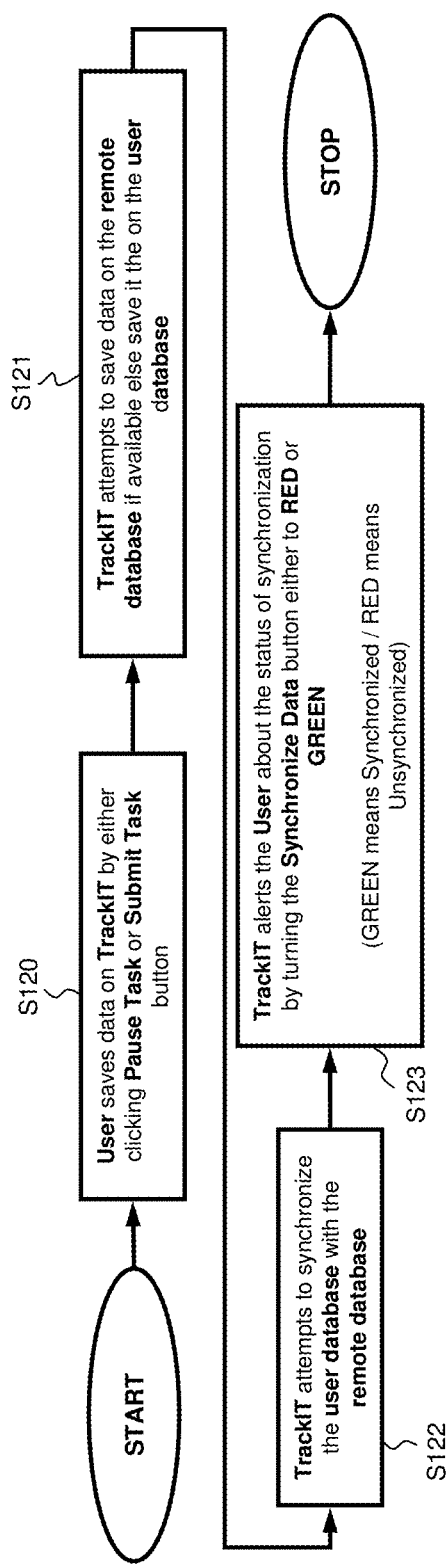
FIG. 11a shows steps which may be performed when a user saves data onto a database and automatic synchronization is set.

FIG. 11a depicts steps which may be performed during synchronization. At least two modes of synchronization are possible.

The first mode, automatic synchronization, may be desirable when communications between the user computer 100 and the remote computer 101 are intermittent. Intermittent communications may result in the remote computer 101 being unavailable to the user computer 100 or inaccessible from the user computer 100, for a period of time. In particular, intermittent communications between the user computer 100 and the remote computer 101 may occur when the network connection between the user computer 100 and the remote computer 101 is lost, or goes out of service at varying intervals.

The second mode, manual synchronization, may be desirable if communications between the user computer 100 and the remote computer 101 are extremely slow or temporarily disabled. Intermittent or extremely slow communications between the user computer 100 and the remote computer 101 may occur due to the use of a virtual private network and/or a remote graphical user interface and/or because of the spatial distance separating the user computer 100 from the remote computer 101. Automatic or manual synchronization mode may be selected in the setup sheet, for example, the setup sheet depicted in FIG. 22.

In step S120, user data is saved or stored in response to a mouse click on either a pause task button 614 or a start task/submit task button 601, as depicted on the tracker sheet. In step S121, the TrackIT program verifies the availability of the remote database. User data is saved on the remote database if the remote database is available, otherwise the user data is saved on the user database 114. In step S122, an attempt is made to synchronize the user database 114 with the remote database. In step S123, an alert is generated which indicates a result of the attempt to synchronize.

Figure 11B:
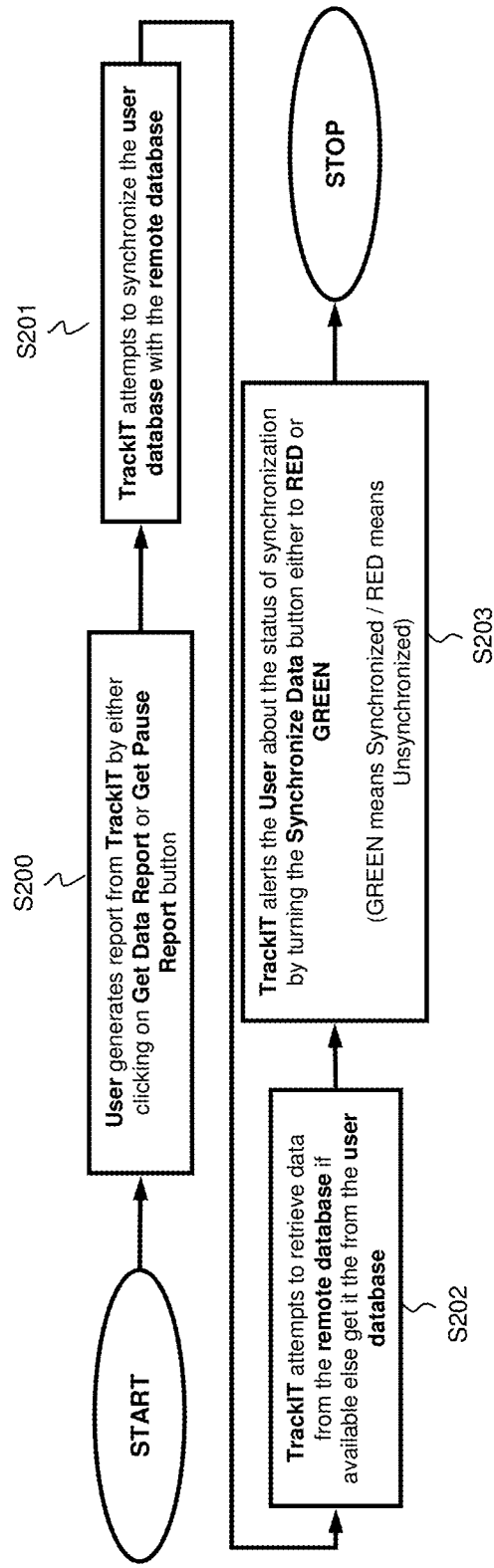
FIG. 11b shows steps which may be performed when a user attempts to generate a task report and automatic synchronization is set.
Figure 24:
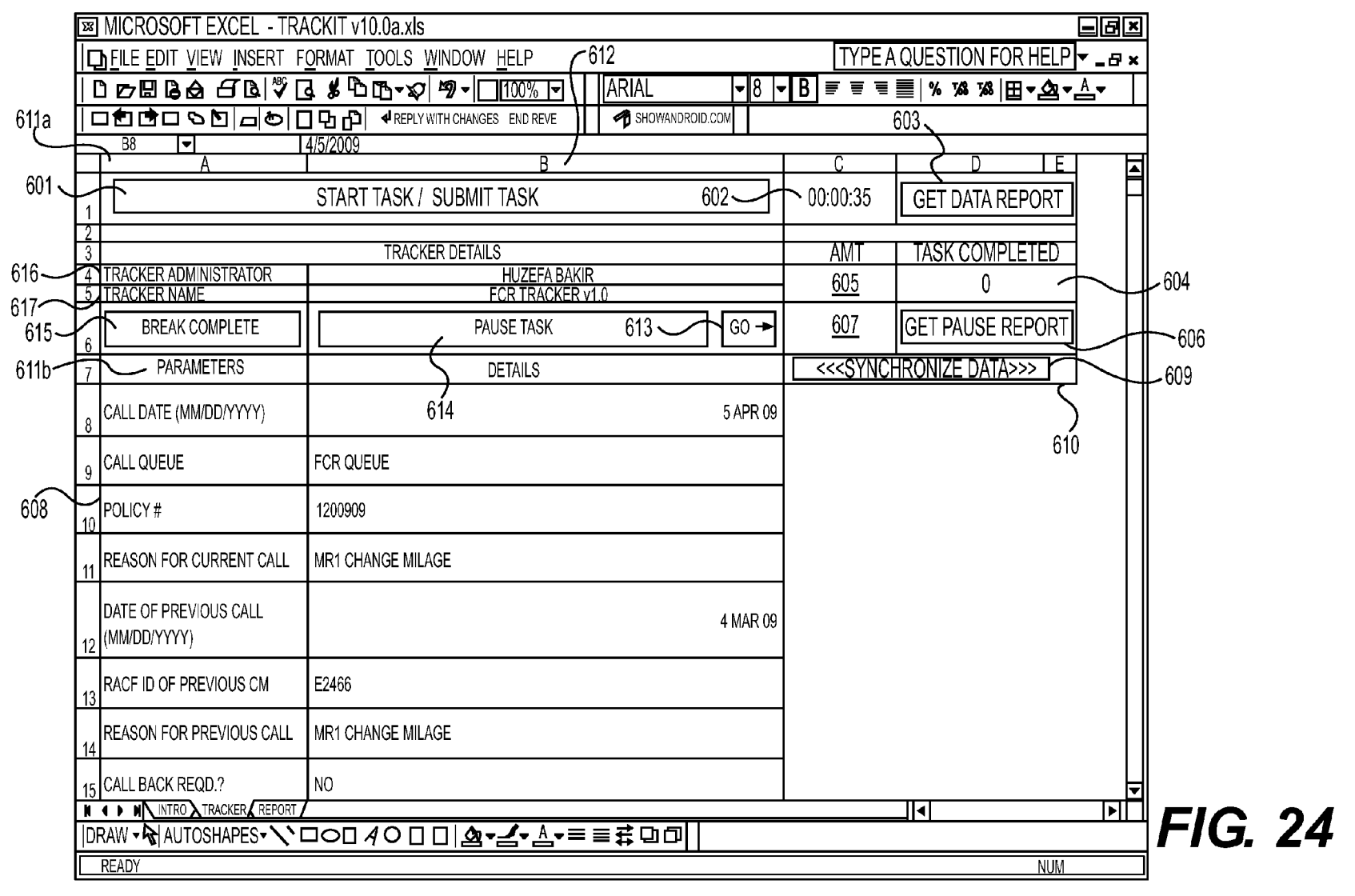

FIG. 11b shows steps which may be performed in order to generate a task report. At step S200, a report may be generated in response to a mouse click on either a get data report button 603 or a get pause report button 606, as depicted in the tracker sheet (FIG. 24). The report may contain user data corresponding to a single user computer 100 and/or a single user. At step S201, an attempt is made to synchronize the user database with the remote database. At step S202, TrackIT verifies the availability of the remote database. If the remote database is available, TrackIT retrieves data from the remote database. If the remote database is unavailable, TrackIT retrieves data from the user database. At step S203, an alert will be generated regarding a result of the attempt to synchronize.

Figure 12A:
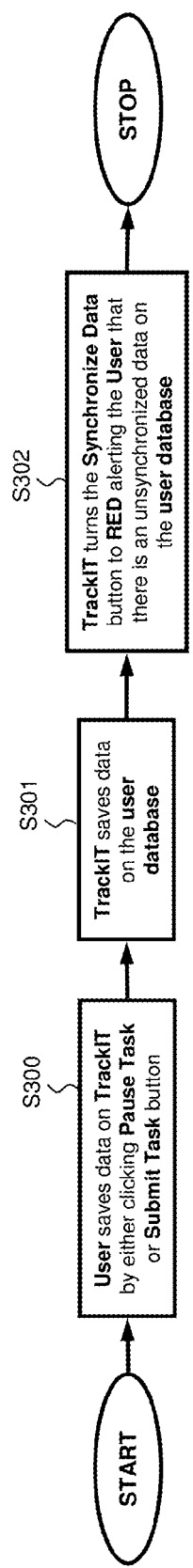
FIG. 12a shows steps which may be performed when a user saves data onto a database and manual synchronization is set.
Figure 12B:
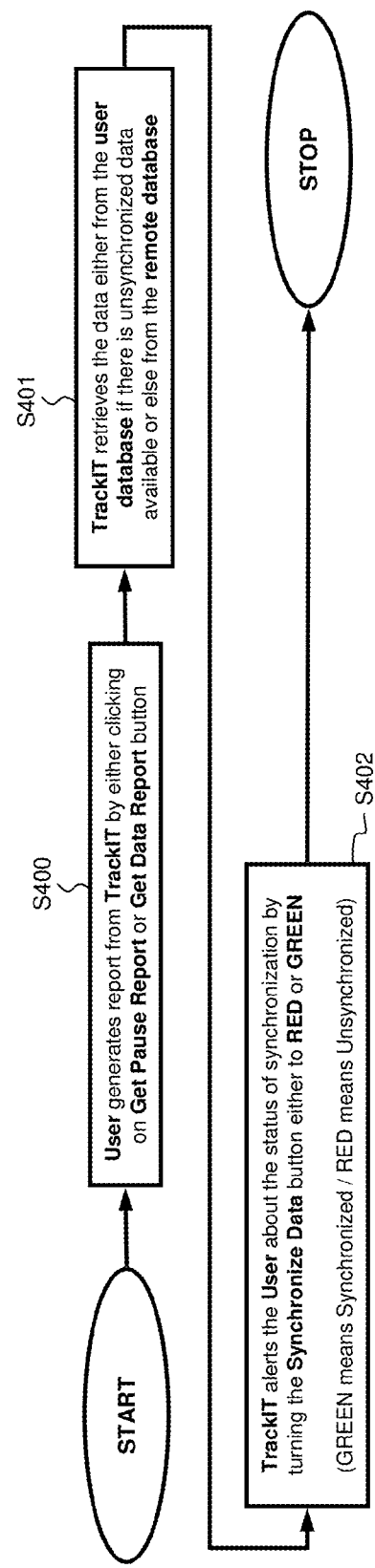
FIG. 12b shows steps which may be performed when a user attempts to generate a task report and manual synchronization is set.

FIG. 12a and FIG. 12b provide an overview of steps performed in manual synchronization mode.

FIG. 12a shows steps which may be performed in order to save or store user data. In step S300, a user saves data by clicking on either the pause task button 614 or the start task/submit task button 601, as depicted in FIG. 24. At step S301, user data is stored on the user database 114. Subsequently, step S302 may be performed.

FIG. 12b shows steps which may be performed in order to generate a task report. At step S401, the TrackIT program will determine whether there is synchronization data in the user database 114. If there is synchronization data in the user database 114, TrackIT will retrieve the synchronization data from the user database 114. If there is no synchronization data in the user database 114, TrackIT will retrieve user data from the remote database. And step 402, TrackIT will provide an alert which indicates whether there is data in the user database which can be synchronized, i.e. synchronization data.

Figure 13:
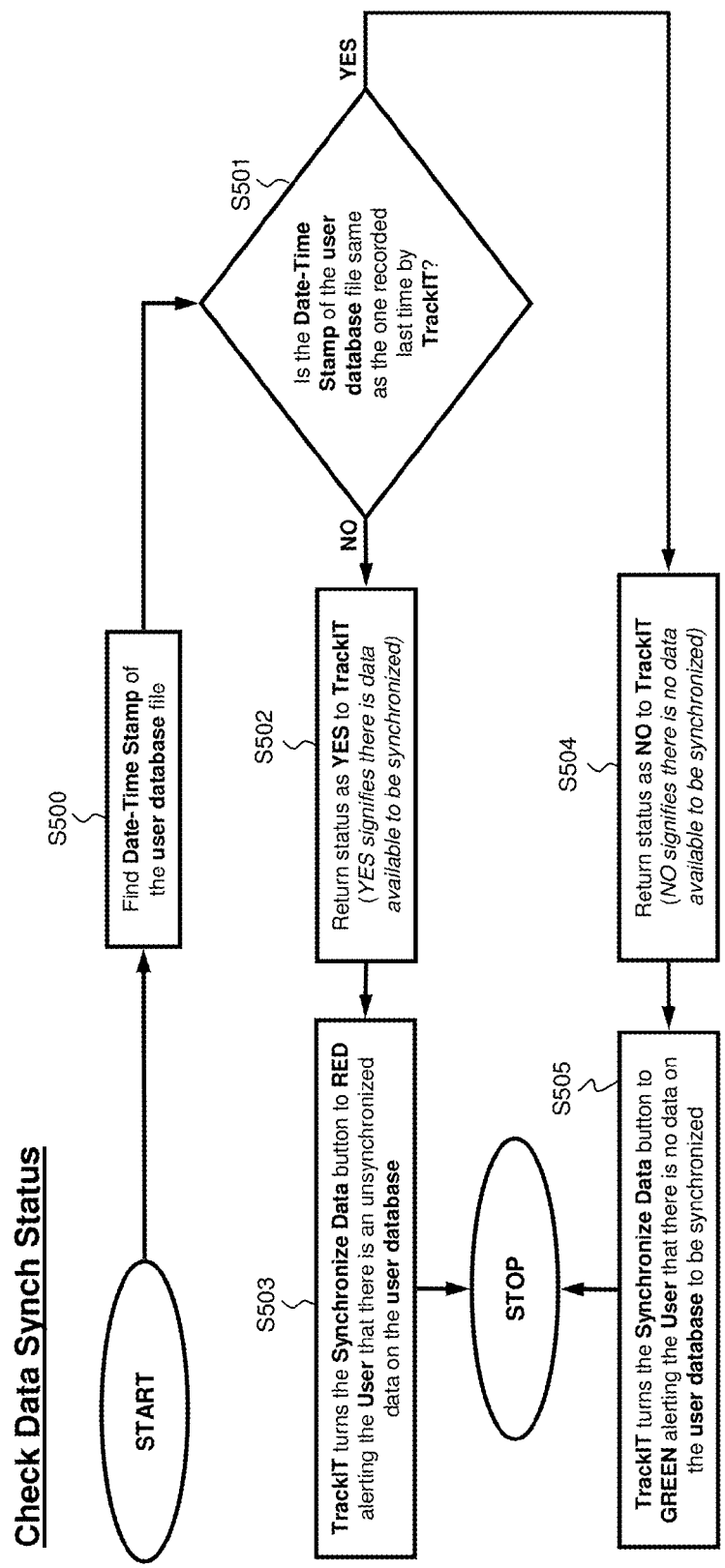
FIG. 13 shows exemplary steps performed to determine whether there is synchronization data in the user database.
Figure 14:
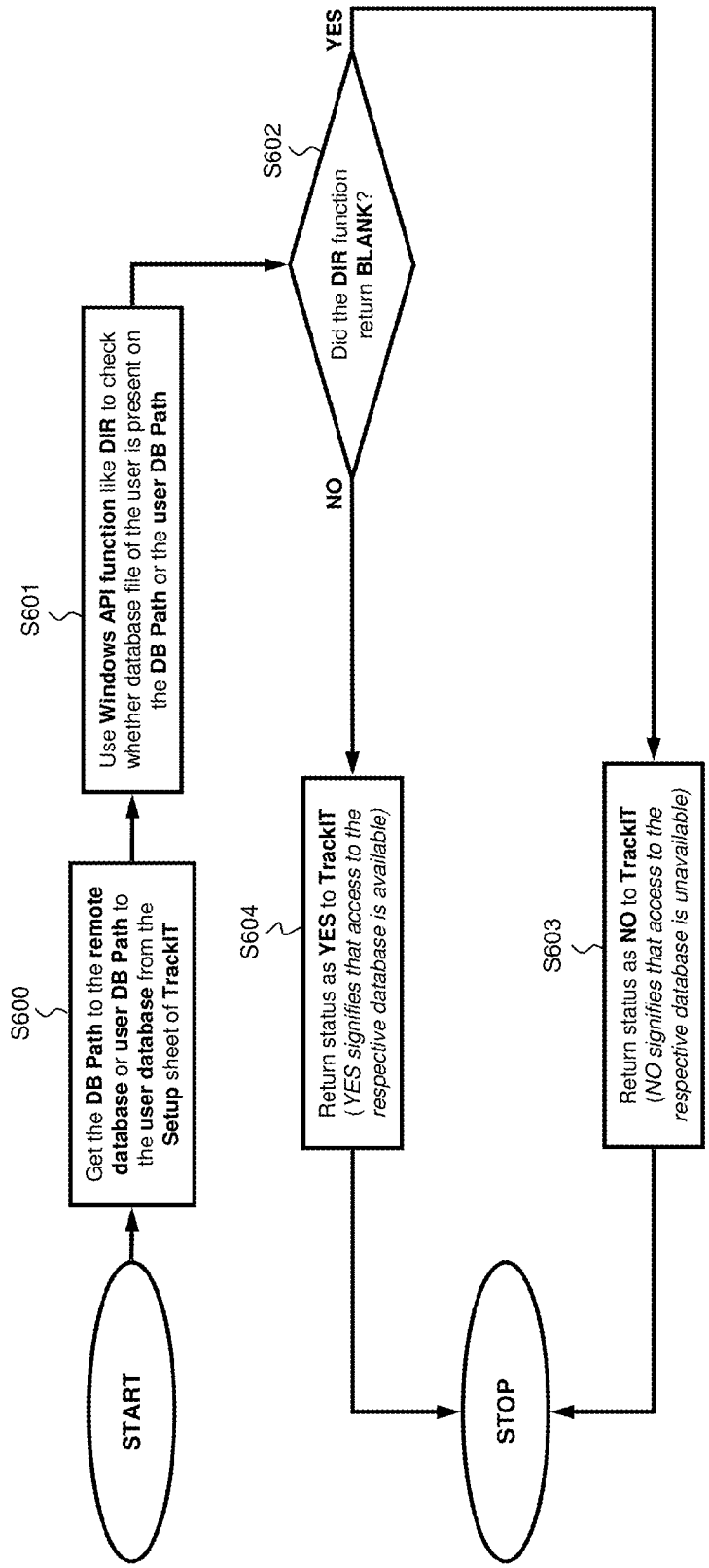
FIG. 14 shows steps which may be performed in order to verify that a database (user or remote) is available.
Figure 15:
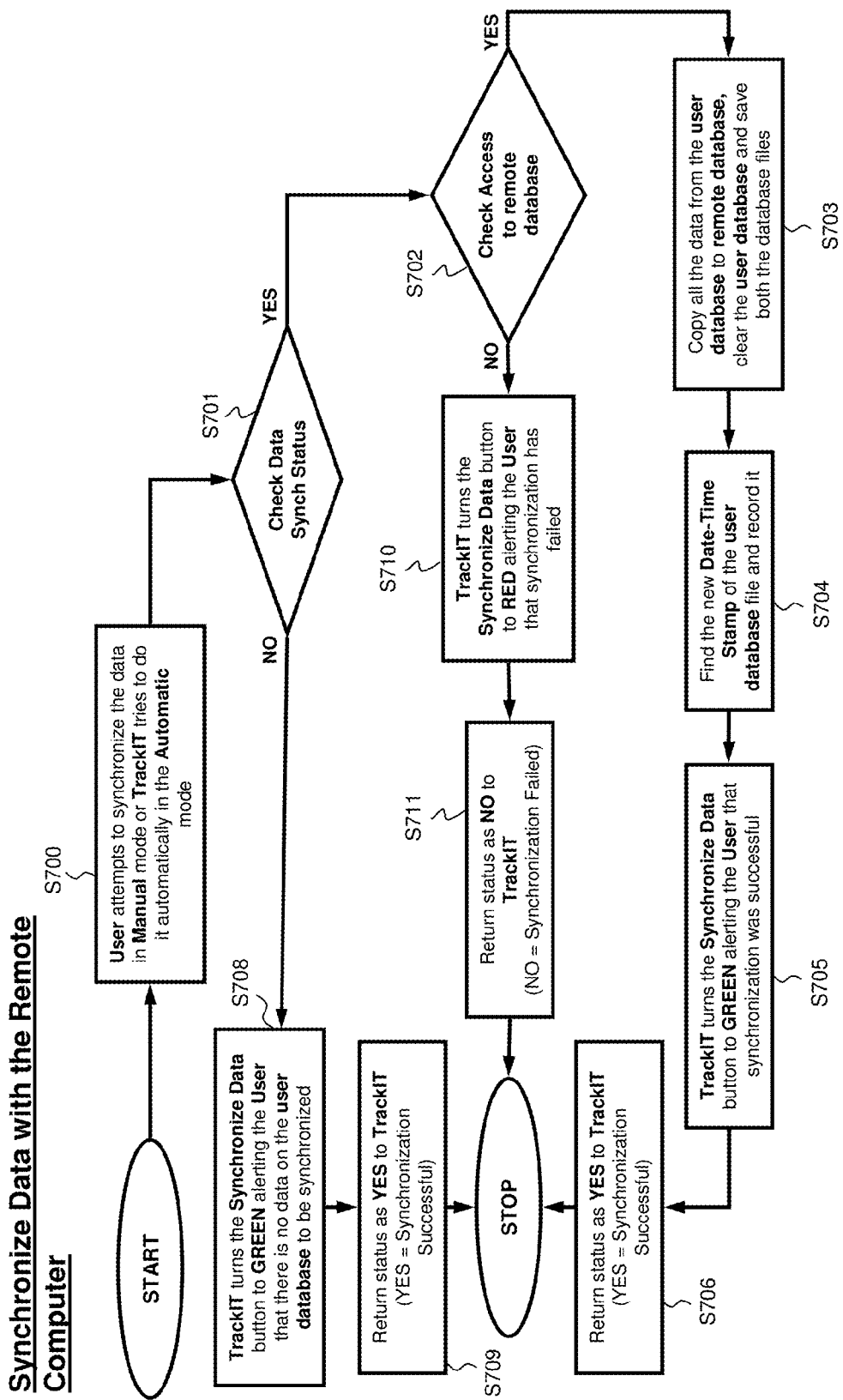
FIG. 15 shows steps which may be performed in order to attempt to synchronize a user database with a remote database.

FIG. 13, FIG. 14 and FIG. 15 depict steps which may be performed during synchronization of the user database with the remote database. The synchronization steps described may have the advantage that it is possible to obtain and store user data (i.e. track data) even when there is no connectivity between the user computer 100 and the remote computer 101. In an outsourcing environment, it is possible that network connectivity is provided by a third party. Thus, the user computer 100 may access the remote computer 101 using a virtual private network (VPN), and/or a remote graphical user interface such as Microsoft Terminal Services or Citrix Independent Computing Architecture. Another remote access tool may also be used in order to access the remote computer 101 from the user computer 100. Due to overhead associated with a VPN, the use of a remote access tool or for some other reason, communications between the user computer 100 and the remote computer 101 may be very slow, or may fail at unpredictable intervals, or both. It is also possible that communication between the user computer 100 and the remote computer 101 may be disabled when the user computer 100 connects to another computer. This may be the case, if the connection between the user computer 100 and the other computer is provided using a VPN.

FIG. 13 shows steps which may be performed in order to determine an indicator which indicates whether there is synchronization data in the user database 114. Synchronization data may be understood as user data in the user database 114 which is available for synchronization with the remote database. In other words, synchronization data is for synchronization with the remote database. In step S500, a timestamp, also referred to as the date-timestamp or date-time stamp, of the user database 114 is determined. According to one example, the timestamp of the user database 114 is determined using the Microsoft Windows application programming interface (API) to check the timestamp of a file containing the user database 114. The timestamp may reflect the year, month, day, hour, and minute that the user database 114 was last modified. The timestamp of the user database retrieved in S500 may also be referred to as the current timestamp of the user database 114. In step S501, a comparison is made between the current timestamp and the timestamp most recently recorded by the TrackIT program. If the current timestamp is the same as the most recently recorded timestamp, step S504 is performed. After step 504, a signal is provided in step S505 which indicates that there is no data in the user database to be synchronized. If the current timestamp is not the same as the most recently recorded timestamp, step S502 is performed. After step S502, an indication is provided in step S503 which may alert the user that there is data in the user database that can be synchronized.

As an alternative to the steps S500 to S505, it is possible that determining the indicator comprises examining a stored value, also referred to as an indicator value. If the stored value indicates that there is synchronization data in the user database, an alert may be provided, similar to the alert provided in step S503.

The steps S500 to S505 described above, as well as the described alternative thereto, may have the advantage of reducing computer resource consumption. In other words, it may be the case that checking the timestamp of a file is more efficient than opening a database and examining its contents.

FIG. 14 shows steps which may be performed in order to check access to the remote database or the user database 114. In other words, steps S600 to S604 may be used to determine whether the remote database or the backup database is available. Steps S600 to S604 may have the advantage of being more efficient than opening a database and reading data from the database. The output of the steps depicted in FIG. 14, as shown in steps S603 and S604, may be used by the TrackIT program to determine which database to save data to or retrieve data from. At step S600, the path to the remote database 401 or the path to the user database 403 is retrieved from the setup sheet. A function from the MS Windows application programming interface, such as the directory listing function, may be used at step S601 to determine whether the selected database file is present. Based on the output of step S601, step S603 or step S604 will be performed in order to provide an indication as to whether the selected database is available.

FIG. 15 shows steps which may be performed when attempting to synchronize the user database 114 with the remote database. The steps depicted in FIG. 15 may be performed in manual synchronization mode or in automatic synchronization mode. At step S700, an attempt to synchronize starts, possibly in response to a user input. Step S701 corresponds to steps S500 to S505, as depicted in FIG. 13. Similarly, step S702 corresponds to steps S600 to S604, as depicted in FIG. 14. Thus, if step S701 results in the determination of an indicator which indicates that there is synchronization data in the user database 114, and step S702 results in the verification of the availability of the remote database, step S703 is performed. In step S703, the user database 114 is synchronized with the remote database, the user database 114 is cleared, and both databases are written to long-term storage, such as a hard disk. In step S704, the timestamp of the user database is recorded. Later, steps S705 and S706 may be performed. If the indicator returned in step S701 indicates that there is no synchronization data in the user database 114, then steps S708 and S709 will be performed. Thus, an indication will be provided that there is no data in the user database that can be synchronized, and an indication will be provided that no synchronization failure occurred. If step S702 returns an indication that the remote database is unavailable, steps S710 and S711 will be performed. Thus, the user will receive an indication of an internal state of the computer system, e.g. synchronization has failed.

Figure 16:
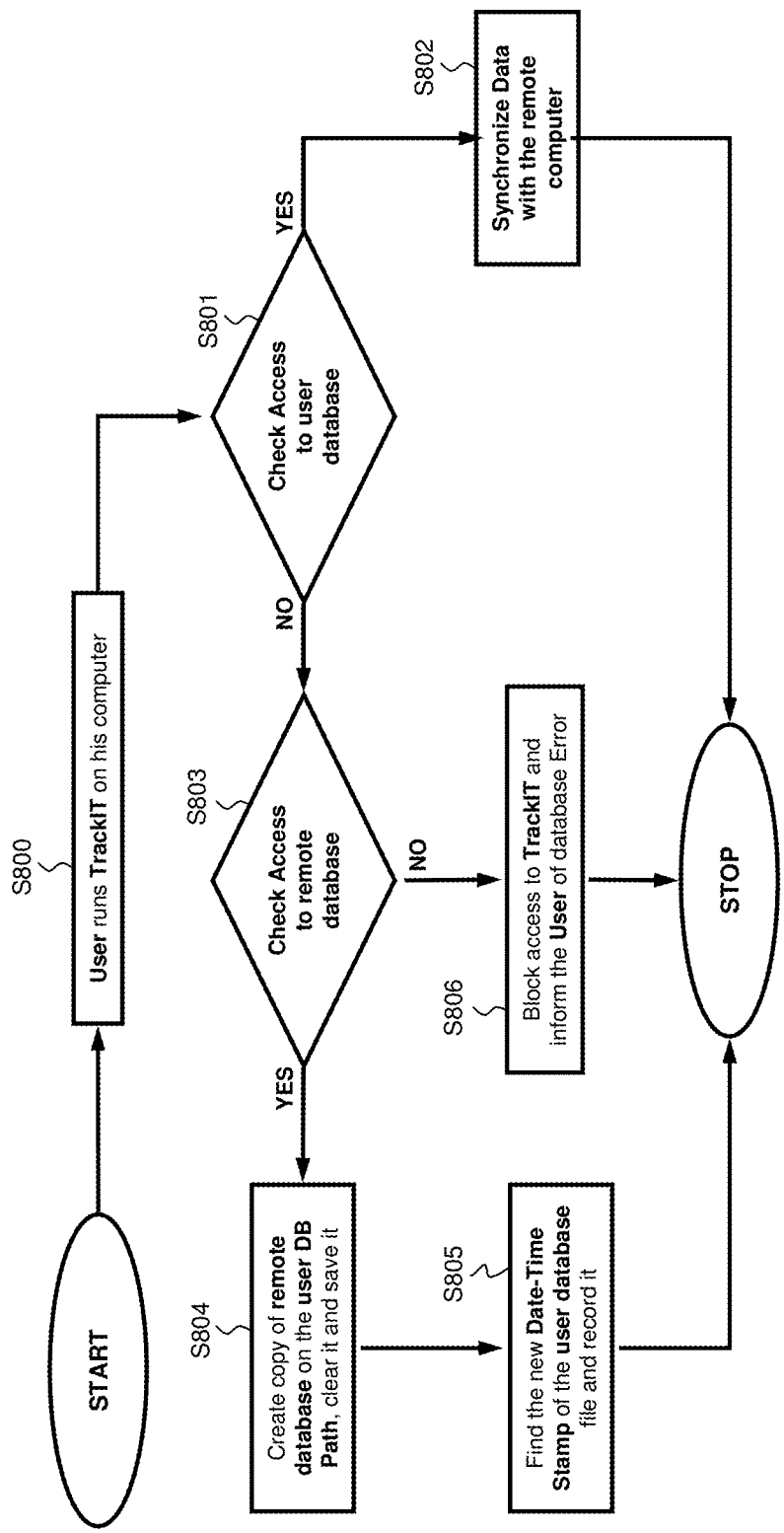
FIG. 16 shows steps which may be performed when a program according to this application is executed from the user computer.

FIG. 16 shows steps which may be performed when the TrackIT program is executed. The TrackIT program may be stored in the TrackIT folder 111 on the remote computer 101. The TrackIT program may be executed from the user computer 100. According to a specific example, the TrackIT program may be a spreadsheet containing macros. Thus, the TrackIT program may be run inside the Microsoft Excel application (or a similar application), located on the user computer 100. Hence, executing TrackIT from the user computer 100, wherein TrackIT is located on the remote computer 101, may include executing the MS Excel application, wherein MS Excel is located on the user computer 100. Step S801 corresponds to steps S600 to S604 as depicted in FIG. 14, to check access to the user database 114. Similarly, step S802 corresponds to steps S700 to S711, as depicted in FIG. 15. Thus, step S802 may be performed after verifying that the backup database is available in step S801. If the backup database is unavailable, an attempt is made to verify the availability of the remote database in step S803. Step S803 corresponds to steps S600 to S604 as depicted in FIG. 14, to check access to the remote database. If access to the remote database is verified, a copy of the remote database is created on a backup DB path 403 (as indicated in FIG. 22), as the user database 114. The remote database may be referred to as the server database and the user database 114 may be referred to as the backup database. Also in step S804, user data is deleted from the newly created user database 114. The backup DB path 403 may be understood as the location of the file or files containing the user database 114, as specified in FIG. 22. In step S805, the timestamp of the user database 114 is recorded. If the remote database is found to be unavailable in step S803, an error is generated in step S806, and a corresponding error message is produced and displayed.

Figure 17:
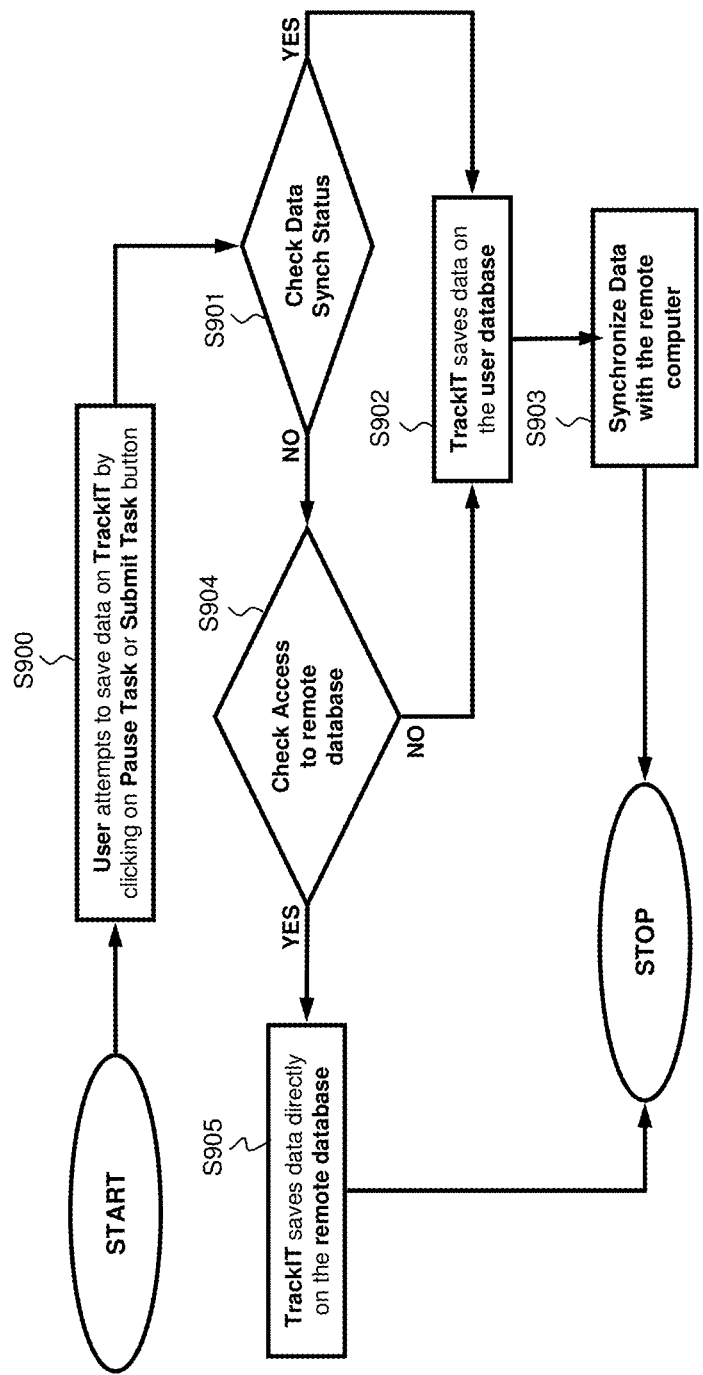
FIG. 17 shows steps which may be carried out when user data is stored on the user database or the remote database.

FIG. 17 shows steps which may be performed when an attempt is made to store or save data in auto synchronization mode. The pause task button 614 and the start task/submit task button 601 indicated in step S900, are depicted in FIG. 24. The start task/submit task button 601 is also referred to as the Submit Task button. Step S901 corresponds to steps S500 to S505, as depicted in FIG. 13. If the result of step S901 is an indicator which indicates that there is synchronization data in the user database 114, user data is saved in the user database 114 in step S902. Step S903 corresponds to steps S700 to S711 as depicted if FIG. 15. Thus, after step S902 the user database 114 is synchronized with the remote database. If the result of step S901 indicates that there is no synchronization data in the user database 114, step S904 is performed. Step S904 corresponds to steps S600 to S604 as depicted in FIG. 14. If the remote database is determined to be unavailable in step S904, steps S902 and S903 are performed. However, if the remote database is determined to be available in step S904, step S905 is performed. Thus, in step S905 user data is stored in the remote database.

Figure 18:
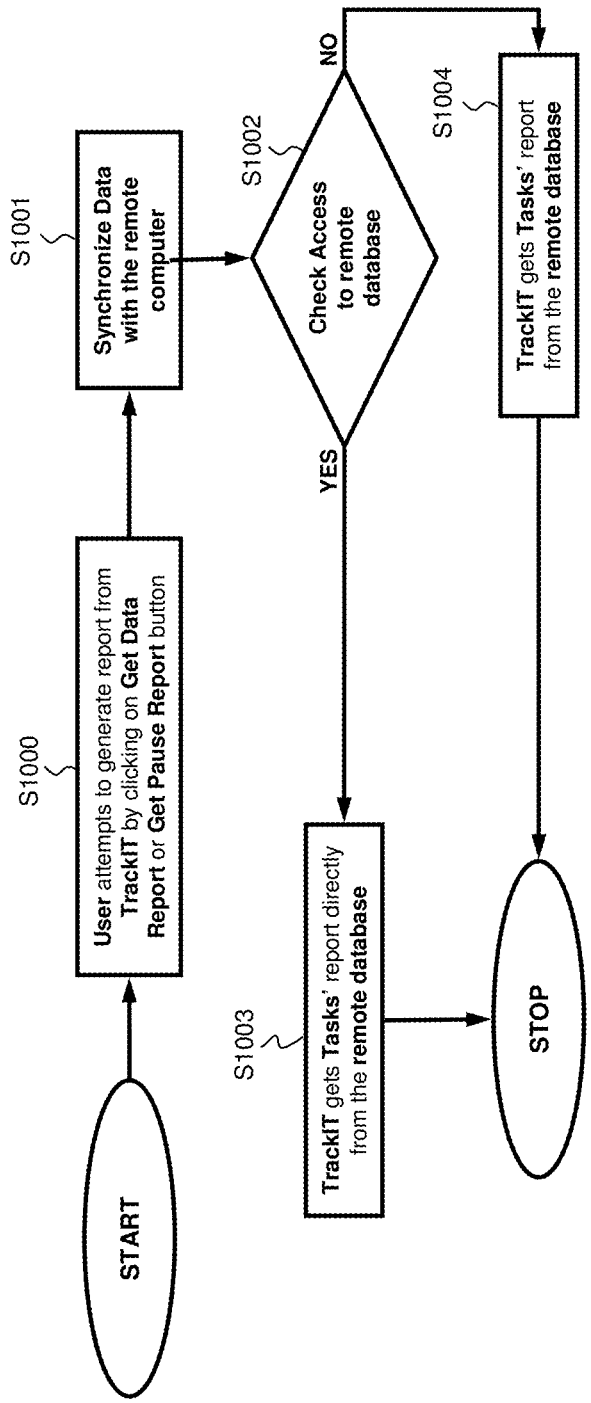
FIG. 18 shows steps which may be carried out in order to generate a report.

FIG. 18 shows steps which may be performed when a report is generated in automatic synchronization mode. The steps may be used to determine how and where to retrieve data, and when to synchronize data. The get data report button 603 and get pause report button 606 indicated in step S1000 may be understood to refer to the buttons depicted in FIG. 24. Step S1001 corresponds to steps S700 to S711 as depicted in FIG. 15. In addition, if step S1001 includes the performance of step S703, it may be that a snapshot of stored user data (including the synchronized data) is taken before closing a connection to the remote database. The snapshot of stored data (i.e. stored user data) may be used to populate the report sheet. At step S1002 the availability of the remote database is determined. If the availability of the remote database is verified, step S1003 is performed. If the remote database is determined to be unavailable, a report is generated in step S1004 using data in the user database 114.

Figure 19:
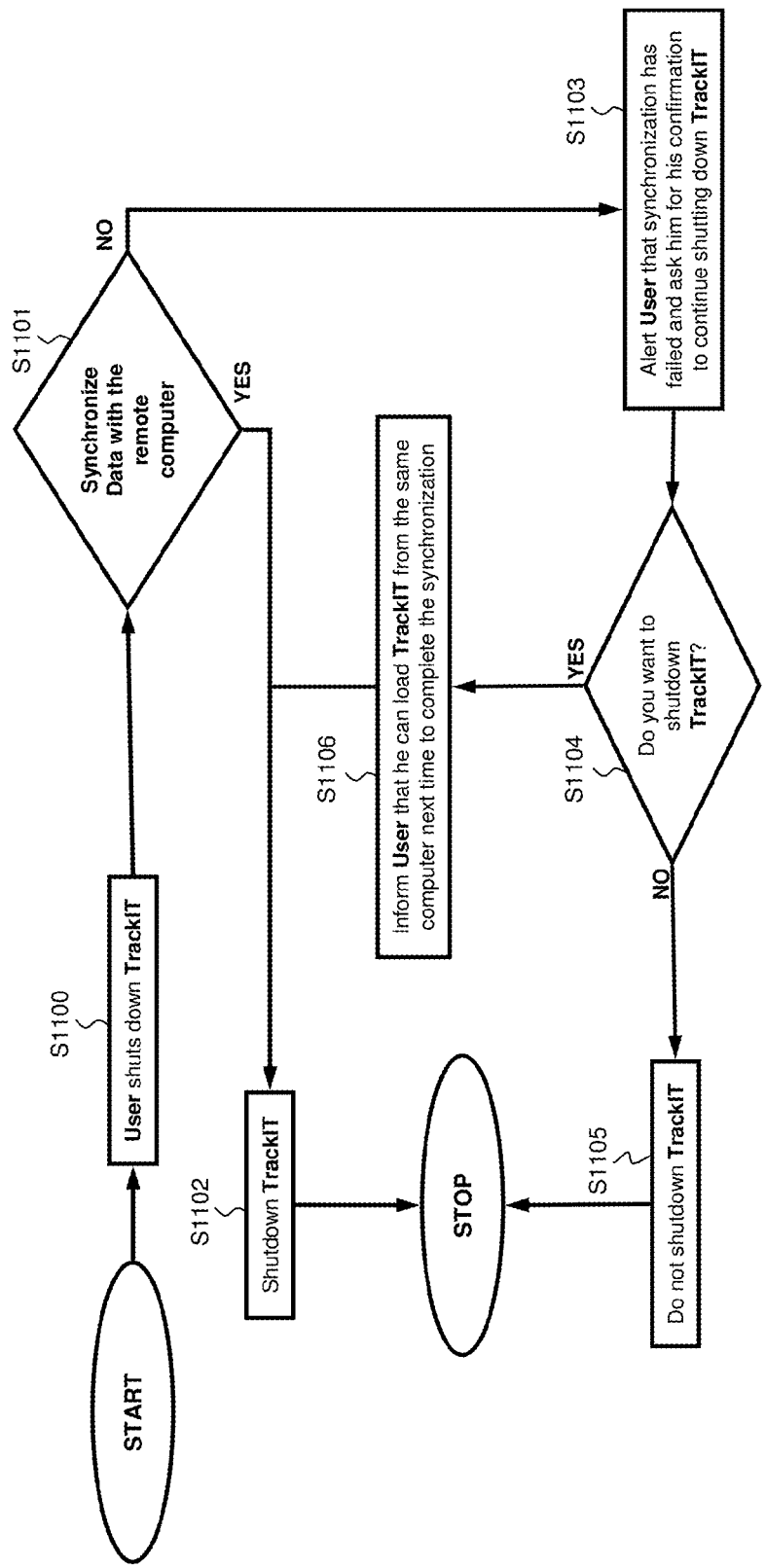
FIG. 19 shows steps which may be performed if user input to shut down a program according to this application is received.

FIG. 19 shows steps which may be performed when the TrackIT program is shut down or stopped on the user computer 100. Accordingly, when user input is received at step S1100 to shut down the TrackIT program, an attempt is made to synchronize the user database 114 with the remote database at step S1101. Step S1101 may be understood to refer to steps S700 to S711, as depicted in FIG. 15. If synchronization of the user database 114 with the remote database is performed successfully in step S1101, the TrackIT program is shut down in step S1102. However, if step S1101 indicates that synchronization was not successful, step S1103 is performed. Thus, the user is provided with a notification on the user interface indicating that the attempt to synchronize was unsuccessful in step S1103.

The notification provided in step S1103 may have the advantage of allowing the user to take action in order to perform synchronization in the future. For example, the user can choose not to shut down the TrackIT program in step S1105. Alternatively, the user can choose to shut down the TrackIT program. In this case, the user will receive an alert in step S1106 indicating that the TrackIT program can be loaded from the same computer (i.e. the computer TrackIT was running on before the program was shut down) in order to complete synchronization at some point in the future.

Figure 20B:
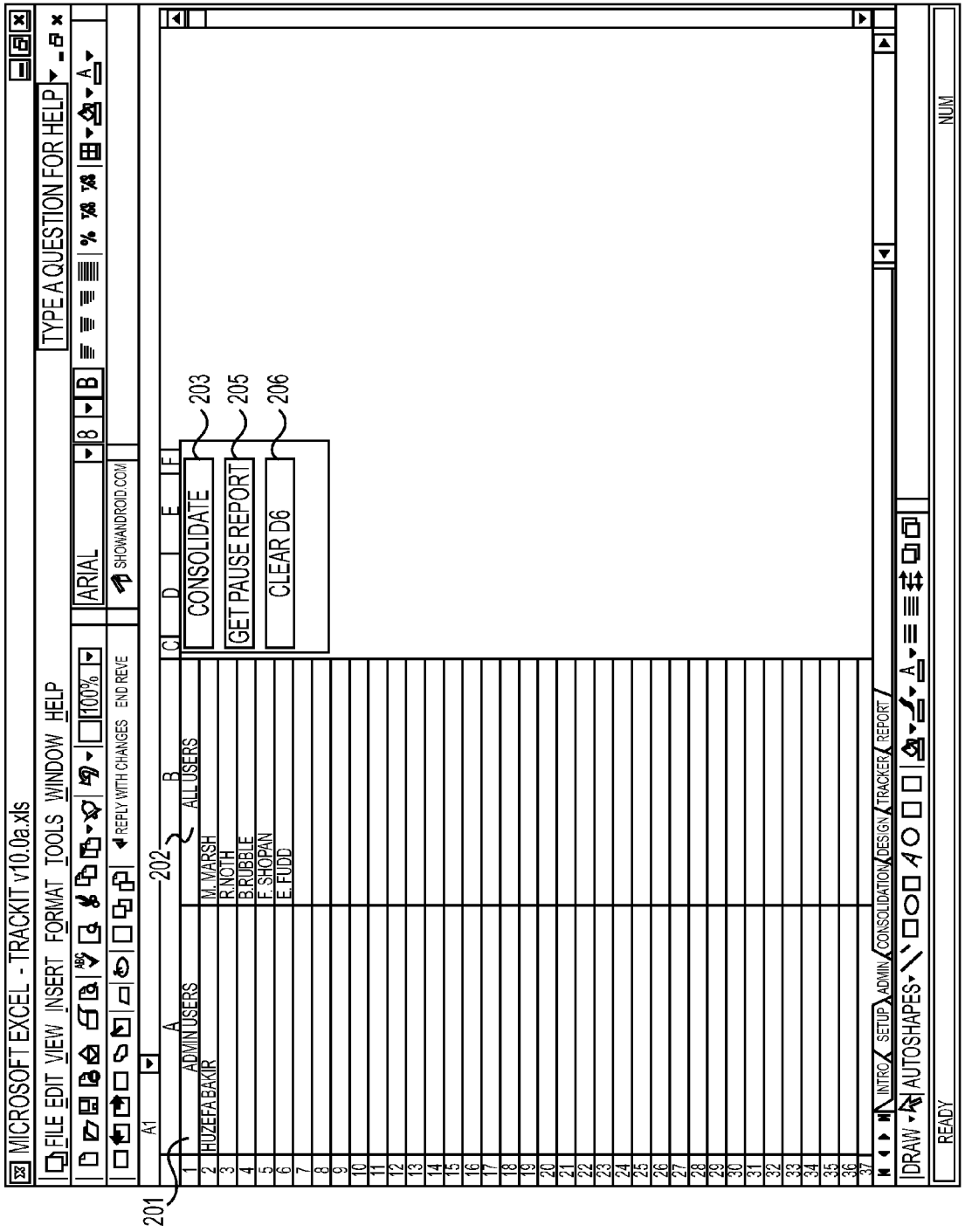
FIG. 20b shows another exemplary screen shot of an admin sheet.

FIG. 20a and FIG. 20b each depict an exemplary screenshot of the admin sheet. The admin sheet facilitates the setup of user and administrator accounts, and allows task reports to be generated. In FIG. 20a the admin sheet is empty, whereas in FIG. 20b one administrator account and five user accounts have been added. An admin users column 201 may comprise identifiers for users who have administrative rights to the TrackIT program. Administrators may be understood as users who are able to view all the sheets of the TrackIT program. An all users column 202 may be used to enter identifiers for all the users who have user access rights to the TrackIT program. Users with the user access rights will be able to view only the INTRO (FIG. 23), tracker (FIG. 24), and report (FIG. 25) sheets of the TrackIT program. According to a specific example, the user identifiers listed in the admin column 201 and the user identifiers listed in the all users column 202 may be Microsoft Windows user account identifiers. Once the users have been entered in the users column 201 and the all users column 202, all the sheets will be available for viewing, as depicted in FIG. 20b. In contrast to FIG. 20b, FIG. 20a shows the sheets available for viewing before entry of user information in the users column 201 and the all users column 202. A consolidate button 203 allows an administrator to generate a report of tasks submitted by all users. Clicking on the consolidation button 203 may cause data to be retrieved from the report sheet of every user and copied to the consolidation sheet, e.g. the consolidation sheet depicted in FIG. 26. A get pause report button 205 allows an administrator to generate a paused task report for all users. The report may also be displayed on the consolidation sheet. A clear DB button 206 allows an administrator to clear or delete tasks submitted by all the users. Clearing the database or deleting the user data recorded in the database may be advantageous in order to free up computer system resources and/or disk space so that more user data may be stored. In addition, clearing the database may speed up operation of the TrackIT program.

FIG. 21 shows an exemplary screen shot of a design sheet. The design sheet may allow a user with administrative access to enter parameters governing how user data is to be tracked. User data may be tracked on the tracker sheet, as shown in FIG. 24. Each row in the design sheet may refer to a single parameter. Fields in a serial number column 301 may be filled in automatically with numbers which can be used to identify parameters. Entries in a parameter name column 302 may be used to identify parameters to be tracked in a way that is understandable to a user. It may be that the design sheet is limited to fifty parameters. Fields in the parameter type column 303 may be populated using a drop down list with the following two selectable entries: plain text and drop down. If plain text is selected, a user will be able to enter any text in the field of a details column 612 corresponding to the parameter. The details column 612 and corresponding parameters are depicted in FIG. 24. If drop down is selected, then the user will be able to fill out the field of the details column 612 corresponding to the parameter by selecting an item from a drop down list. Fields in a mandatory column 304, may provide a drop down list with the selectable values of yes and no. If yes is selected, a blank entry in the field of the details column 612 corresponding to the parameter is prohibited. If no is selected, the field of the details column 612 corresponding to the parameter may be left blank.

Fields in a data type column 305 may be used to define the data type of the parameter. Fields in a key column 306 may be used to specify whether the parameter specified in the corresponding row is a key value. A "Yes" in a field of the key column 306 indicates that the parameter is a key value. Key values are described further in connection with FIG. 24. A last column 307 is a reference to the column which has the last option for the drop down. The last column 307 is relevant if the drop down option is specified in the parameter type column 303. One or more options for dropdown columns 308, starting with H and continuing to FA in the example of FIG. 21, may contain options for a corresponding drop down menu. Data in the options for dropdown column(s) 308 may only be relevant when drop down is selected in the parameter type column 303 of the corresponding row.

FIG. 22 shows an exemplary screen shot of a setup sheet. A user with administrative access may use the setup sheet to configure the TrackIT program. The value of a DB path 401 may be used to define the location of the remote database. Preferably, the value of the DB path 401 refers to a path that is accessible by the user computer 100. According to one specific example, the value of the DB path 401 includes an Internet Protocol address and a list of directories that can be traversed to reach a shared resource (e.g. a shared folder) on a computer system running Microsoft Windows. A create DB button 402 may be used by a user with administrative access to create database files at the location specified by the DB path 401. A user with administrative access may be understood as a user listed in the admin users column 201 of the admin sheet. A DB backup path 403 (also referred to as the backup DB path) may be understood as the path to the user database 114. The user database may be located on the user computer 100 or on a separate local computer. If the backup DB path 403 refers to a local server, it may specify a shared resource on a local server. It may also be the case that communications between the user computer 100 and the local computer are more reliable than communications between the user computer 100 and the remote server 101. The local computer may be understood as a computer which is spatially near the user computer 100. According to a specific example, Microsoft Windows environment variables may be used to define the backup DB path 403. Thus, "%USERPROFILE%/My Documents" may point to the corresponding user's "My Documents" path. A tracker name field 404 may be used to specify the label displayed when viewing the INTRO and Tracker sheets. A TrackIT administrator 405 may be used to indicate the name of the administrator who has designed the parameters in the design sheet. A display timer 406 may be used to indicate whether a timer 602, as depicted in FIG. 24, will be displayed on the tracker sheet. A synchronize automatically 407 provides a drop down list with the selectable values of yes and no. If yes is selected, then TrackIT will operate in automatic synchronization mode. Thus, the remote database becomes the default location to save user data, and data will be saved in the user database 114 only when the remote database is unavailable. When the remote database becomes available again, synchronization data in the user database 114 will automatically be synchronized with the remote database. On the other hand, if synchronize automatically 407 is set to no, the user database 114 is the default location to save user data. Thus, the user database 114 will be synchronized with the remote database only after receipt of input from the user. Accordingly, manual synchronization will only occur when the user clicks on a synchronize data button 609 on the tracker sheet. A TrackIT path 408 provides the path to the TrackIT folder 111 which may contain a computer program that can be used to obtain and store user data, e.g. the TrackIT.xls program. The TrackIT program may be remotely executed from the user computer 100 in order to provide a user interface on the user computer 100. The TrackIT program may be configured so that input of user data is prohibited or blocked if the TrackIT program file (or files) is copied from the remote computer 101 to another computer, such as the user computer 100. TrackIT may be understood as a computer program even though it requires the Microsoft Excel application in order to be executed. This is because TrackIT comprises steps, e.g. macros, which may be understood as instructions that can be executed by a computer. A blank entry in the TrackIT path field 408 will allow a user to run the TrackIT program from any location.

Figure 23:
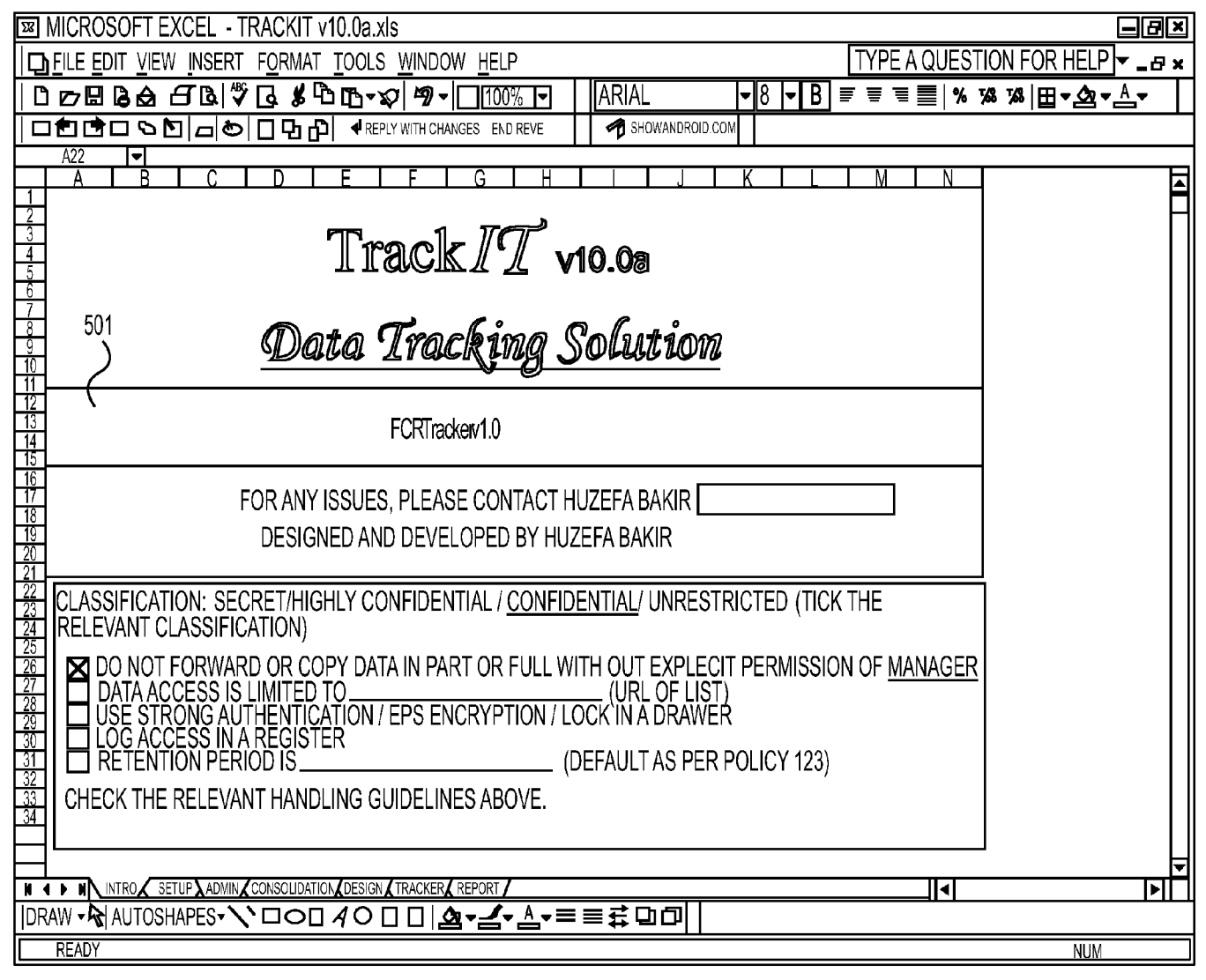

FIG. 23 provides an exemplary screen shot of the intro (or INTRO) sheet. The intro sheet may provide error messages and may comply with the information security standards of an outsourcing environment. The label row 501 may be used to display the name entered in the tracker name field 404 of a setup sheet. In addition, the label row 501 may be used to display one of the following error messages, which may have been generated while loading the TrackIT program:

macro disabled, which is displayed when macros are not enabled;

database error, which is displayed when both the remote database and the user database 114 are not available;

access denied, which is displayed when a user not listed in the all users column 202 attempts to run the TrackIT program from the user computer 100;

TrackIT path invalid, which is displayed when an attempt is made to run TrackIT from a path which does not correspond to the value of the TrackIT path 408.

Other error messages are also possible. If an error message is generated, only the intro sheet with the corresponding error message will be displayed. No other sheets, e.g. the tracker sheet, will be accessible.

FIG. 24 shows the tracker sheet. The tracker sheet may be used to enter user data. The start task/submit task button 601 may be used to start and submit tasks to the user database 114 or the remote database. After clicking on the start task/submit task button 601, the parameters defined in the design sheet, as depicted in FIG. 21, are loaded in to the tracker sheet and the timer 602 is started. Later, after another click on the start task/submit task button 601, all mandatory fields as defined in the mandatory column 304 of the design sheet, as depicted in FIG. 21, are validated. After validation of the mandatory fields, the task may be submitted. After the task is submitted, all the parameters are loaded and the timer 602 is reset. The timer 602 will track the time that has elapsed since a task was started. A timer cell 602 flashes red and black without displaying the timer, if a display timer 406 is set to no. If the get data report button 603 is selected, e.g. by clicking on the get data report button 603, a report is generated corresponding to the tasks stored (i.e. user data). The user data may be understood to comprise tasks entered by a user. The report generated after clicking on the get data report button 603 may be provided on the report sheet, as depicted in FIG. 25. A task completed field 604 may display the number of tasks submitted. An AHT field 605 may display an AHT (Average Handle Time, i.e. the time required to handle a task) of submitted tasks. The get pause report button 606 may be used to generate a report of tasks paused by the user. The report of paused tasks may be generated on the report sheet.

Clicking on the get pause report button 606 may populate a drop down list cell 607 with the key values of the tasks paused. According to the example depicted in FIG. 24, a policy number 608 of the task is the key value. This is defined in the key column 306 of the design sheet. Thus, when a task is paused, the policy number 608 of the task is copied to the drop down list cell 607. The synchronize data button 609 may be used in manual synchronization mode to attempt to synchronize the user database 114 with the remote database. Furthermore, the background of a synchronize data button 610 may be green if there is no data to be synchronized or if synchronization was successful. The background of the synchronize data button 610 may be red in order to alert the user that synchronization has failed. A leftmost column 611*a* includes a parameters column 611*b*. The parameters column 611*b* begins under a break complete button 615. The parameters column 611*b* may contain the names of parameters of the task being tracked. A details column 612, beginning under a pause task button 614, may contain details associated with each named parameter. According to the example depicted, the parameter names provided in column 611, and the format of data entered in the details column 612 are defined in the design sheet. A go button 613 can be used to load a pause task after a key value from the drop down list cell 607 has been selected. After clicking on the go button 613, the corresponding details of the task will be loaded in the details column 612, and the timer 602 will resume with the time that was saved when the task was paused. The pause task button 614 may be used to pause the task the user is currently tracking. The task can only be paused after the key parameter, as defined in the key column 306 of the design sheet, has been entered. The break complete button 615 may be used to track breaks. Thus, after a task has been started using the start task/submit task button 601, a user may click on the break complete button 615 in order to track a break from the task. The break complete button may be used to track time spent resting or relaxing. The values corresponding to a TrackIT administrator 616 and a tracker name 617 are the respective values entered for tracker administrator 405 and tracker name 404 in the setup sheet depicted into FIG. 22.

FIG. 25 shows an exemplary screenshot of the report sheet, which may be displayed after clicking on the get data report button 603 or the get pause report button 606. The report sheet may be used to display user data corresponding to a single user. The report sheet may be used to display user data in the user database 114 or user data in the remote database. Each field of a key column 701 may contain a key value corresponding to a paused task. According to the example shown, the fields of the key column 701 are only filled in when the report is generated in response to a click on the get pause report button 606. In the exemplary screenshot depicted in FIG. 25, the report was generated using the get data report button 603. Thus, the fields in the key column 701 are blank. Each field in an entry ID column 702 contains a user identifier. According to a specific example, the user identifier is a Microsoft Windows user account name or login name. Fields in an entry date column 703 may contain the date when user data for the corresponding task was stored. Fields in an entry time column 704 may contain the time when user data for the corresponding task was stored. Fields in a tracker admin column 705 may each contain the value corresponding to the tracker administrator 405 entered in the setup sheet. Each field in a tracker name column 706 may contain the value corresponding to the tracker name 404 entered in the setup sheet. Each field in an AHT column 707 may contain the time required to complete the corresponding task. The fields in an entry type column 708 may each contain a type of entry for the respective task. A value in a field in the entry type column 708 may be one of the following:

- task done, the submitted task was completed without any pauses or breaks;
- task break, a break entry denoting that a rest break was taken;
- task pause, the task was submitted with at least one pause;
- date-time-stamp, a paused task with a timestamp showing the exact day and time when the task was paused, multiple timestamps separated by delimiters may be used to denote that the task was paused more than once.

Other entry types are also possible. The other columns depicted, such as a call date column 709, correspond to task parameters.

FIG. 26 shows an exemplary consolidation sheet which may be used to view all user data in the remote database. The fields of an NT ID column 801 contain user identifiers for accessing the TrackIT program. According to a specific example, the user identifiers are Microsoft Windows user account names. A user identifier in the fields of NT ID column 801 may correspond to one of the user identifiers in all users column 202 of the admin sheet. Fields in an entry date column 802 may contain the date when user data for the corresponding task was stored. Fields in an entry time column 803 may contain the time when user data for the corresponding task was stored. The date and time in the entry date 802 and entry time 803 columns respectively, may correspond to when the entry was first saved to a database, i.e. the user database 114 or the remote database. The fields in a tracker admin column 804 may each contain the value corresponding to the tracker administrator 405. The fields in the tracker name column 805 each contain the value corresponding to the tracker name 404. The fields in an AHT column 806 may each contain the time taken to complete the corresponding task. An entry type column 807 may contain the type of entry for the corresponding task. Fields in the entry type column 807 may have one of the following values depending on how the task was stored:

- task done, a submitted task which was completed without any pauses or breaks;
- task break, a break entry denoting that a rest break was taken;
- task pause, a submitted task which included at least one pause;
- date-time-stamp, a paused task with a timestamp showing the exact day and time when the task was paused, multiple timestamps separated by delimiters may be used to denote that the task was paused more than once.

Other entry types are also possible. Other columns displayed in FIG. 26 may include parameters and parameter details tracked for a task.

FIG. 27 shows an exemplary system for implementing the invention including a general purpose computing device in the form of a conventional computing environment 920 (e.g. a personal computer). The conventional computing environment includes a processing unit 922, a system memory 924, and a system bus 926. The system bus couples various system components including the system memory 924 to the processing unit 922. The processing unit 922 may perform arithmetic, logic and/or control operations by accessing the system memory 924. The system memory 924 may store information and/or instructions for use in combination with the processing unit 922. The system memory 924 may include volatile and non-volatile memory, such as a random access memory (RAM) 928 and a read only memory (ROM) 930. A basic input/output system (BIOS) containing the basic routines that helps to transfer information between elements within the personal computer 920, such as during start-up, may be stored in the ROM 930. The system bus 926 may be any of several types of bus structures including a memory bus or memory controller, a peripheral bus, and a local bus using any of a variety of bus architectures.

The personal computer 920 may further include a hard disk drive 932 for reading from and writing to a hard disk (not shown), and an external disk drive 934 for reading from or writing to a removable disk 936. The removable disk may be a magnetic disk for a magnetic disk driver or an optical disk such as a CD ROM for an optical disk drive. The hard disk drive 932 and the external disk drive 934 are connected to the system bus 926 by a hard disk drive interface 938 and an external disk drive interface 940, respectively. The drives and their associated computer-readable media provide nonvolatile storage of computer readable instructions, data structures, program modules and other data for the personal computer 920. The data structures may include relevant data for the implementation of the data processing method for obtaining and storing data in an outsourcing environment. The relevant data may be organized in a database, for example a relational or object database.

Although the exemplary environment described herein employs a hard disk (not shown) and an external disk 936, it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk 936, ROM 930 or RAM 928, including an operating system (not shown), one or more application programs 944, other program modules (not shown), and program data 946. The application programs may include at least a part of the functionality as depicted in FIGS. 1 to 26.

A user may enter commands and information, as discussed below, into the personal computer 920 through input devices such as keyboard 948 and mouse 950. Other input devices (not shown) may include a microphone (or other sensors), joystick, game pad, scanner, or the like. These and other input devices may be connected to the processing unit 922 through a serial port interface 952 that is coupled to the system bus 926, or may be collected by other interfaces, such as a parallel port interface 954, game port or a universal serial bus (USB). Further, information may be printed using printer 956. The printer 956, and other parallel input/output devices may be connected to the processing unit 922 through parallel port interface 954. A monitor 958 or other type of display device is also connected to the system bus 926 via an interface, such as a video input/output 960. In addition to the monitor, computing environment 920 may include other peripheral output devices (not shown), such as speakers or other audible output.

The computing environment 920 may communicate with other electronic devices such as a computer, telephone (wired or wireless), personal digital assistant, television, or the like. To communicate, the computer environment 920 may operate in a networked environment using connections to one or more electronic devices. FIG. 27 depicts the computer environment networked with remote computer 962. The remote computer 962 may be another computing environment such as a server, a router, a network PC, a peer device or other common network node, and may include many or all of the elements described above relative to the computing environment 920. The logical connections depicted in FIG. 27 include a local area network (LAN) 964 and a wide area network (WAN) 966. Such networking environments are commonplace in offices, enterprise-wide computer networks, intranets and the Internet and may particularly be encrypted.

When used in a LAN networking environment, the computing environment 920 may be connected to the LAN 964 through a network I/O 968. When used in a WAN networking environment, the computing environment 920 may include a modem 970 or other means for establishing communications over the WAN 966. The modem 970, which may be internal or external to computing environment 920, is connected to the system bus 926 via the serial port interface 952. In a networked environment, program modules depicted relative to the computing environment 920, or portions thereof, may be stored in a remote memory storage device resident on or accessible to remote computer 962. Furthermore other data relevant to the data processing system and method (described above) may be resident on or accessible via the remote computer 962. It will be appreciated that the network connections shown are exemplary and other means of establishing a communications link between the electronic devices may be used.

The computing system described above is only one example of the type of computing system that may be used to implement the data processing method for obtaining and storing user data in an outsourcing environment.

APPENDIX I

List of Reference Numerals

100 user computer
101 remote computer 102 admin computer
104 client computer
111 TrackIT folder
112 remote database folder
114 user database
920 conventional computing environment
922 processing unit
924 system memory
926 system bus
928 random access memory (RAM)
930 read only memory (ROM)
932 hard disk drive
934 external disk drive
936 removable disk
938 hard disk drive interface
940 external disk drive interface
944 one or more application programs
946 program data
948 keyboard
950 mouse
952 serial port interface
954 parallel port interface
956 printer
958 monitor
960 video input/output
962 remote computer
964 local area network (LAN)
966 wide area network (WAN)
968 network I/O
970 a modem

What is claimed is:

1. A data processing method for obtaining and storing data in an outsourcing environment, the method including:
   providing a user interface on a user computer;
   receiving, at the user interface, user data to be stored either in a user database located at a user computer or in a remote database located at a remote computer;
   prior to storing the user data received at the user interface, determining an indicator that indicates whether there is data already stored in the user database to be synchronized with the remote database;
   if the indicator indicates that there is data already stored in the user database to be synchronized with the remote database, the method further comprises:
      storing the user data received at the user interface in the user database with the data already stored in the user database, and
      synchronizing the user database with the remote database; and
   if the indicator indicates that there is no data already stored in the user database to be synchronized with the remote database, the method further includes:
      determining whether the remote database is available,
      if the remote database is determined to be unavailable, storing the user data received at the user interface in the user database, and attempting to synchronize the user database with the remote database, and
      if the remote database is determined to be available, storing the user data in the remote database.

2. The method of claim 1 wherein, if the indicator indicates that there is data already stored in the user database to be synchronized with the remote database, the method further includes:
   verifying whether the remote database is available; and in the affirmative,
   synchronizing the user database with the remote database; and
   recording a timestamp of the user database.

3. The method of claim 2, wherein determining the indicator comprises obtaining a current timestamp of the user database and comparing the current timestamp with the recorded timestamp.

4. The method of claim 1, wherein determining the indicator comprises examining an indicator value, and wherein, if the indicator value indicates that there is data already stored in the user database to be synchronized with the remote database, the method further includes:
   verifying whether the remote database is available; and in the affirmative,
   copying the user data in the user database to the remote database; and
   setting the indicator value to indicate that there is no data already stored in the user database.

5. The method of claim 1, wherein the user computer and the remote computer are connected by a network, and wherein the remote computer is accessed by the user computer using a virtual private network and/or a remote graphical user interface.

6. The method of claim 1, wherein providing the user interface on the user computer further comprises executing a computer program on the remote computer from the user computer.

7. The method of claim 6, wherein the computer program is configured so that input of user data is prohibited if the computer program is executed directly on the user computer.

8. The method of claim 1, further including:
   receiving user input selecting the user database as a default database; and
   attempting to synchronize the user database with the remote database after receiving a signal to synchronize the user database with the remote database.

9. The method of claim 1 wherein, if the indicator indicates that there is data already stored in the user database to be synchronized with the remote database, the method further includes:
   verifying whether the remote database is available; and in the affirmative,
   opening a connection from the user computer to the remote computer;
   synchronizing the user database with the remote database; and
   copying stored user data, including the synchronized data, from the remote database to the user computer before closing the connection to the remote database.

10. The method of claim 1, further including:
    if user input to shut down the user interface is received, synchronizing the user database with the remote database if there is data already stored in the user database; and
    providing a notification on the user interface if the synchronization was unsuccessful.

11. A non-transitory computer readable storage medium on which is embedded computer readable instructions, which, when loaded and executed on a computer, cause the computer to:
    obtain, via a user interface, user data to be stored either in a user database located at a user computer or in a remote database located at a remote computer;
    prior to storing the user data received at the user interface, determine an indicator that indicates whether there is data already stored in the user database to be synchronized with the remote database;

if the indicator indicates that there is data already stored in the user database to be synchronized with the remote database,
store the user data received at the user interface in the user database with the data already stored in the user database; and
synchronize the user database with the remote database; and
if the indicator indicates that there is no data already stored in the user database to be synchronized with the remote database,
determine whether the remote database is available;
if the remote database is determined to be unavailable, store the user data received at the user interface in the user database, and attempt to synchronize the user database with the remote database; and
if the remote database is determined to be available, store the user data in the remote database.

12. A data processing system to obtain and store user data in an outsourcing environment, the system including:
a user computer including a user database and a user interface, wherein the user interface is to obtain user data to be stored either in the user database at the user computer or in a remote database at a remote computer; and
an indicator which indicates whether there is data stored in the user database to be synchronized with the remote database;
wherein, prior to storing the user data received at the user interface, the user computer is to determine the indicator that indicates whether there is data already stored in the user database to be synchronized with the remote database,
wherein, if the indicator indicates that there is data already stored in the user database to be synchronized with the remote database, the user computer is to:
store the user data received at the user interface in the user database with the data already stored in the user database, and
synchronize the user database with the remote database, and
wherein, if the indicator indicates that there is no data already stored in the user database to be synchronized with the remote database, the user computer is further to:
determine whether the remote database is available,
if the remote database is determined to be unavailable, store the user data received at the user interface in the user database, and attempt to synchronize the user database with the remote database, and
if the remote database is determined to be available, store the user data in the remote database.

* * * * *